United States Patent [19]

Nakamura et al.

[11] Patent Number: 5,771,352
[45] Date of Patent: Jun. 23, 1998

[54] COMMUNICATION CONTROL APPARATUS AND METHOD

[75] Inventors: Makoto Nakamura; Yosuke Tajika, both of Hyogo-ken; Akihiko Sugikawa, Osaka-fu; Masako Sato, Tokyo; Kazuaki Iwamura; Teruhiko Ukita, both of Hyogo-ken, all of Japan

[73] Assignee: Kabushiki Kaisha Toshiba, Japan

[21] Appl. No.: 420,851

[22] Filed: Apr. 12, 1995

[30] Foreign Application Priority Data

Apr. 14, 1994  [JP]  Japan .................................. 6-075757
Apr. 28, 1994  [JP]  Japan .................................. 6-091599
Apr. 28, 1994  [JP]  Japan .................................. 6-091600

[51] Int. Cl.[6] .................................................. H04B 1/00
[52] U.S. Cl. ................................ 395/200.57; 395/200.55
[58] Field of Search ........................ 395/200.01, 200.06, 395/200.1, 200.12, 200.16, 200.09, 200.3, 200.55, 200.5, 200.57, 200.75, 200.47; 455/53.1

[56] References Cited

U.S. PATENT DOCUMENTS

| 4,864,559 | 9/1989 | Perlman ..................................... 370/60 |
| 5,067,154 | 11/1991 | Hosobuchi . |
| 5,109,484 | 4/1992 | Hughes .................................. 395/200.1 |
| 5,128,981 | 7/1992 | Tsukamoto ................................ 379/58 |
| 5,305,373 | 4/1994 | Mizumito ................................ 379/61 |
| 5,446,897 | 8/1995 | Mathias ................................... 395/700 |
| 5,515,509 | 5/1996 | Rom ..................................... 395/200.1 |
| 5,555,376 | 9/1996 | Theimer ............................. 395/200.09 |
| 5,564,070 | 10/1996 | Want ..................................... 455/53.1 |

FOREIGN PATENT DOCUMENTS

0 579 372 A2   1/1994   European Pat. Off. .

OTHER PUBLICATIONS

Data Communications Symposium, Sep. 1985, pp. 172–179.
Information Age, Oct. 4, 1988, vol. 10, No. 4, pp. 203–210.

*Primary Examiner*—Tod R. Swann
*Assistant Examiner*—Christopher S. Chow
*Attorney, Agent, or Firm*—Graham & James LLP

[57] ABSTRACT

Communication control apparatus capable of communicating among plural users when the plural users bring respective equipment into proximity of each other includes a transmission section to transmit terminal discriminating information to discriminate a particular terminal. A receiving section receives terminal discriminating information transmitted by another terminal or terminals. A discrimination section discriminates other terminal(s) capable of communicating with the particular terminal in accordance with the terminal discriminating information received by the receiving section. A group-set section sets one terminal or plural terminals among terminals discriminated by the discrimination means as members of the same group. An information sending section sends the same information to the terminals set by the group-set means.

35 Claims, 32 Drawing Sheets

| PHYSICAL IDENTIFIER | ATTRIBUTE |
|---|---|
| 0 0 1 | A |
| 0 0 3 | B |
| ⋮ | |
| 0 0 5 | (SELF) |
| 0 0 7 | A |

Fig.6A

| PHYSICAL IDENTIFIER | COLLECTED INFORMATION | |
|---|---|---|
| | PHYSICAL IDENTIFIER | ATTRIBUTE |
| 0 0 1 | 0 0 2 | B |
| | 0 0 3 | A |
| | 0 0 5 | A |
| 0 0 3 | 0 0 1 | A |
| | 0 0 5 | B |
| | 0 0 7 | A |
| ⋮ | ⋮ | ⋮ |
| 0 0 7 | 0 0 1 | A |
| | 0 0 5 | B |

Fig.6B

| PHYSICAL IDENTIFIER | ATTRIBUTE |
|---|---|
| 0 0 1 | A |
| 0 0 5 | (SELF) |

Fig.6C

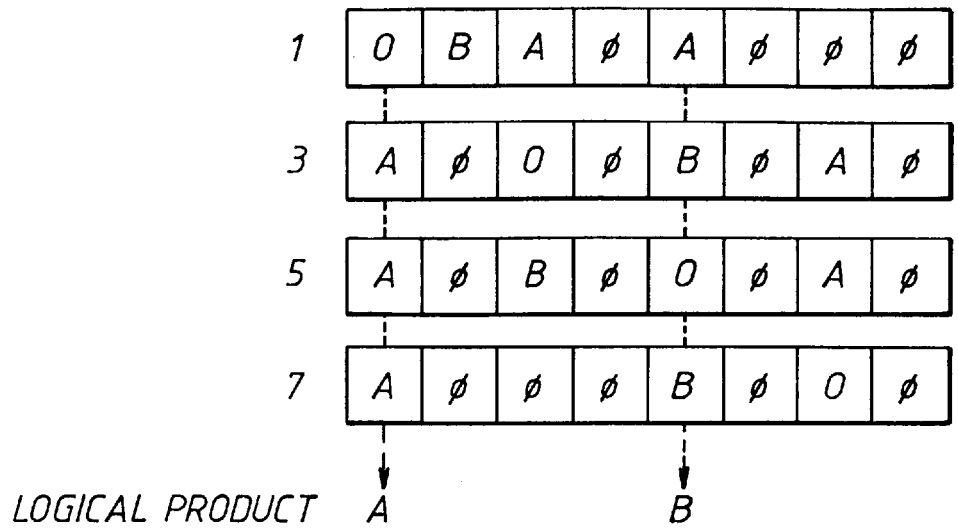
Fig. 7A
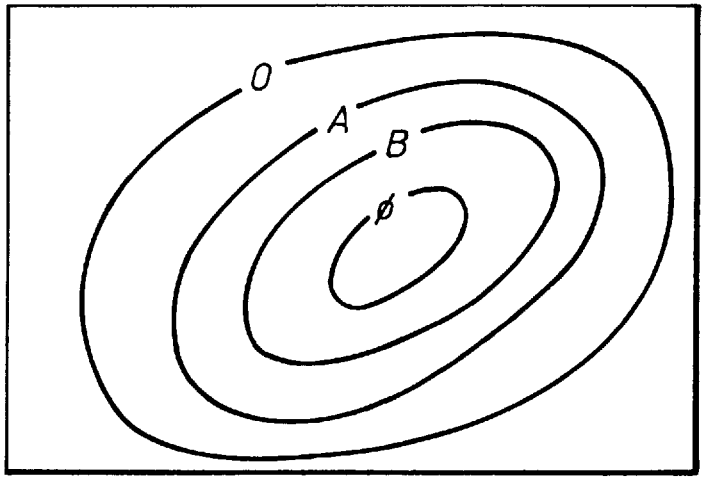
Fig. 7B
$A \cap O = A$     $A \cap B = B$
$B \cap O = B$     $O \cap \emptyset = A \cap \emptyset = B \cap \emptyset = \emptyset$
Fig. 7C

| GROUP-IDENTIFIER | PHYSICAL-IDENTIFIER | USER-IDENTIFIER |
|---|---|---|
| 01.00.02.01 | 001 | 001 |
| 01.00.02.02 | 003 | 003 |
| 01.00.03.01 | 007 | 007 |
| 01.00.02.00 | 001.003 | SUB GROUP-A |
| 01.00.03.00 | 007. | SUB GROUP-B |
| 01.00.00.00 | 001.003.007 | GROUP-A |
| ... | ... | ... |

Fig.10

| GROUP IDENTIFIER | COMMUNICATION CHANNEL |
|---|---|
| 01.00.02.01 | 1 |
| 01.00.02.02 | 1 |
| 01.00.03.01 | 2 |
| 01.00.02.00 | 1 |
| 01.00.03.00 | 2 |
| 01.00.00.00 | 0 |

Fig.12

| GROUP-IDENTIFIER | NUMBER OF TERMINALS | TERMINAL-IDENTIFIER |
|---|---|---|
| 1 | 2 | 5,7 |
| 3 | 4 | 1,3,6,7 |
| ⋮ | ⋮ | ⋮ |

*Fig.16*

| GROUP-IDENTIFIER | NUMBER OF CONNECTION | CONNECTION-IDENTIFIER |
|---|---|---|
| 1 | 3 | 4,5,8 |
| 3 | 2 | 1,3 |
| ⋮ | ⋮ | ⋮ |

*Fig.17*

| SENDING-SEQUENCE NUMBER | 8 |
|---|---|

| TERMINAL-IDENTIFIER | CONFIRMATION-SEQUENCE NUMBER | RECEIVING-SEQUENCE NUMBER |
|---|---|---|
| 1 | 6 | 10 |
| 3 | 7 | 2 |
| ⋮ | ⋮ | ⋮ |

| GROUP-IDENTIFIER | TERMINAL-IDENTIFIER | USER-IDENTIFIER | APPLICATION |
|---|---|---|---|
| 1 0 0 0 0 | 1 0 0 0 0 1<br>1 0 3 0 0 0 | 1 0<br>2 0 | MEETING |
| 2 0 0 0 0 | 1 0 1 0 0 0<br>1 0 1 0 2 0<br>1 0 1 0 3 0 | 5 1<br>6 1<br>7 1 | MEETING |
| 3 0 0 0 0 | 0 0 2 0 0 0 | 1 0 0 | |

Fig. 27

| GROUP-IDENTIFIER | DISPLAY ATTRIBUTE | PARTICIPATION ATTRIBUTE |
|---|---|---|
| 1 0 0 0 0 | POSSIBLE FOR DISCRIMINATING INFORMATION | IMPOSSIBLE |
| 2 0 0 0 0 | POSSIBLE | POSSIBLE |
| 3 0 0 0 0 | IMPOSSIBLE | IMPOSSIBLE |

Fig. 28

| GROUP-IDENTIFIER | CONTENTS | USER NAME | DISCRIMINATING INFORMATION |
|---|---|---|---|
| 1 0 0 0 0 | ARRANGEMENT OF BUDGET | JOHN<br>MIKE | MEETING ROOM 3 |
| 2 0 0 0 0 | BUSINESS CONNECTION | STEVE<br>GEORGE<br>MARY | MEETING ROOM 308 |
| 3 0 0 0 0 | | JIM | |

Fig. 29

| IMPORTANT MATTER | USER |
|---|---|
| MEETING ROOM 308 BUSINESS CONNECTION | STEVE GEORGE MARY |

Fig. 30

Mr. TOM PARTICIPATES IN THE GROUP.

| IMPORTANT MATTER | USER |
|---|---|
| MEETING ROOM 308 BUSINESS CONNECTION | STEVE GEORGE MARY TOM |

Fig. 31

COMMUNICATION CONTROL APPARATUS AND METHOD

BACKGROUND OF THE INVENTION

1. Field of the Invention

The present invention relates to a communication control apparatus and method, such as portable communication devices, capable of communicating among plural users when the plural users bring their respective devices into proximity of each other.

2. Description of the Related Art (1) First problem of the related art

In accordance with one method for communicating among a large number of terminals, there is a general idea that a base station is provided for switching. For example, as for portable telephones, a large number of base stations are respectively set in predetermined areas and a customer can communicate by means of a portable terminal (portable information equipment) through the base station. In this case, the base station, to which the user's own terminal belongs, can only connect to specified terminals. Therefore, the user must previously know which other terminals belong to the base station. In short, it is necessary for each user to know the identities of the specified terminals. Each user cannot communicate with many and unspecified other terminals. It is also necessary to set the base station per predetermined area. Therefore, its application is limited to a large scale communication service, such as automobile telephones being utilized with a charge account system.

An example of a method for communicating among a large number of terminals without charge account is a wireless LAN(local area network). The wireless LAN has a bandwidth of "100 KHz–10 MHz". During communication, a packet signal is transmitted as a burst after confirming no other wireless transmission is present. A terminal which is located in the receiving area of the packet signal intercepts the packet signal if the identification number of the receiving terminal was added to the packet signal.

In this method, it is necessary for each user to know the identification number of another user's terminal to which data is to be sent. The wireless LAN can then transmit the packet signal through a base station. The area in which a user of a terminal can move freely is limited to the receiving area of the packet signal. In short, it is impossible for a user to communicate with many and unspecified terminals without location restriction.

(2) Second problem of the related art

Recently, a cooperative work support system for connecting among a large number of terminals has been developed. In the cooperative work support system, it is necessary for each user's terminal to share the same data. In such a system, multipoint-to-multipoint connection(MMC) is appropriate as a communication connection for sharing data among all users. In the cooperative work support system, it is necessary to send plural kinds of data, such as text data, image data, sound data and so on. Accordingly, plural MMC's are set among all user's terminals in accordance with the kind of data.

In the prior art, when a new terminal subscribes to the cooperative work support system, the user of the new terminal must know all of the kinds of MMC's set to the cooperative work support system, and request a subscription to each MMC. It is necessary for each MMC to change its setting because of the new user's subscription. Therefore, there is a problem in that the setting procedure is complicated.

(3) Third problem of the prior art

In a communication network for connecting among a large number of terminals, each user gains information about terminals and the process on the network. However, the information about a process is represented as an identifier which is a number to be controlled by the terminal. Therefore, in the case where a user of a terminal wants to communicate with the process, it is difficult for the user to determine the process with which he wants to communicate.

For example, in a meeting support system for plural users, plural meetings are capable of progressing on the network simultaneously. In this case, a communication connection is set for each meeting application and data for the meeting is transmitted through the communication connection.

In the case that a meeting has already begun and a user wants to attend the meeting afterwards, the user selects the meeting from among plural meetings. However, as information for the user to select the meeting, only the identifier of the communication connection is displayed on the user's terminal. It is therefore difficult for the user to determine the meeting with which he wants to communicate.

In this case, the user can also request connection to the meeting by using the identifier of the communication connection. However, the identifier of the communication connection is altered whenever the meeting is opened. Accordingly, the user cannot previously know the identifier corresponding to the meeting which he wants to attend. As a result, it is difficult for a user to attend the meeting after it has begun.

On the other hand, a user may not want to disclose the existence of a communication connection (meeting) to others. In this case, the user generally cannot designate the security degree of the meeting. Therefore, it is impossible to prohibit the disclosure of the presence of the meeting to others.

For example, in the meeting support system, it is supposed that a user inputs a meeting name to make a distinction among meetings. Some users do not want to disclose the existence of the meeting or members of the meeting to others. However, others can learn the information through their terminals. Subsequently, a user may want to limit the participants of the meeting. In this case, the members of the meeting have been previously registered. However, in this method, it is impossible to limit the members of the meeting dynamically.

SUMMARY OF THE INVENTION

It is therefore an object of the present invention to provide communication control apparatus and method for communicating among many and unspecified terminals without restriction on location.

It is another object of the present invention to provide a communication control apparatus and method for which a subscription procedure for MMC is easy.

It is a further object of the present invention to provide a communication control apparatus and method for which it is easy for a user to decide the communication connection which the user wants to make.

In accordance with the present invention, there is provided a communication control apparatus, comprising;

transmission means for transmitting terminal discriminating information to discriminate a particular terminal;

receiving means for receiving terminal discriminating information transmitted by another terminal;

discrimination means for discriminating at least one other terminal capable of communicating with the particular terminal in accordance with the terminal discriminating information received by said receiving means, group-set means for setting the particular terminal and the other terminal(s) discriminated by said discrimination means as member terminals of a group; and information sending means for sending same information to each member terminal of the group.

Also according to the present invention, there is provided a communication control apparatus, comprising;

terminal information storage means for storing terminal information identifying at least one other terminal capable of communicating with a particular terminal;

terminal information transfer means for transferring the terminal information to the other terminal(s);

collected information storage means for storing the terminal information transferred to the particular terminal by the at least one other terminal as collected information; and terminal restriction means for restricting terminals capable of communicating with each other in accordance with the terminal information and the collected information.

Further according to the present invention, there is provided a communication control apparatus, comprising;

group set means for setting one group to plural terminals making a communication request to a particular terminal; and multipoint-to-multipoint set means for setting multipoint-to-multipoint connections among all terminals in the group set by said group set means.

Additionally according to the present invention, there is provided a communication control apparatus, comprising:

group set means for setting a group to plural terminals in accordance with a request for communication;

group-identifier memory means for storing a group-identifier of the group set by said group set means;

discriminating information input means for inputting discriminating information of the group-identifier stored in said group-identifier memory means;

discriminating information exchange means for exchanging the discriminating information with another terminal of the group;

discriminating information storage means for storing the discriminating information exchange by said discriminating information exchange means;

discriminating information request means for requesting the discriminating information of the group-identifier; and display means for displaying the discriminating information of the group-identifier requested by said discriminating information request means.

Also according to the present invention, there is provided a communication control apparatus, comprising:

equipment information storage means for storing equipment information identifying equipment capable of communicating with a particular terminal;

equipment information transfer means for transferring the equipment information to other equipment;

collected information storage means for storing equipment information transferred by the other equipment as collected information;

equipment restriction means for restricting equipment capable of communicating with each other in accordance with the equipment information and the collected information;

exchange means for exchanging function-information of the particular equipment with function-information of the other equipment restricted by said equipment restriction means;

processing equipment restriction means for restricting equipment having a function which the particular equipment does not have, in accordance with the function-information exchanged by said exchange means; and information transfer means for transferring information to the other equipment restricted by said processing equipment restriction means, wherein the information is necessary for processing by the function of the other equipment.

BRIEF DESCRIPTION OF THE DRAWINGS

FIG. 6A is a terminal-information management table.

FIG. 6B is a collected-information management table.

FIG. 6C is a restricted-information management table.

FIG. 7A illustrates terminal arrays for discrimination of a physical identifier.

FIG. 7B illustrates a logical relational chart among attributes.

FIG. 7C illustrates logical equations defining attributes.

FIG. 10 is a table for storing terminal-identifier information.

FIG. 12 is a table for storing group-identifiers and corresponding communication channels.

FIG. 16 is a group-management table.

FIG. 17 is a connection-management table.

FIG. 27 is a group management table.

FIG. 28 is a group attribute management table.

FIG. 29 is a group information management table.

FIG. 30 is a display arrangement of the group-information.

FIG. 31 is a display arrangement in which a new terminal is connected to the group.

DETAILED DESCRIPTION OF THE PREFERRED EMBODIMENTS

Figure 1:
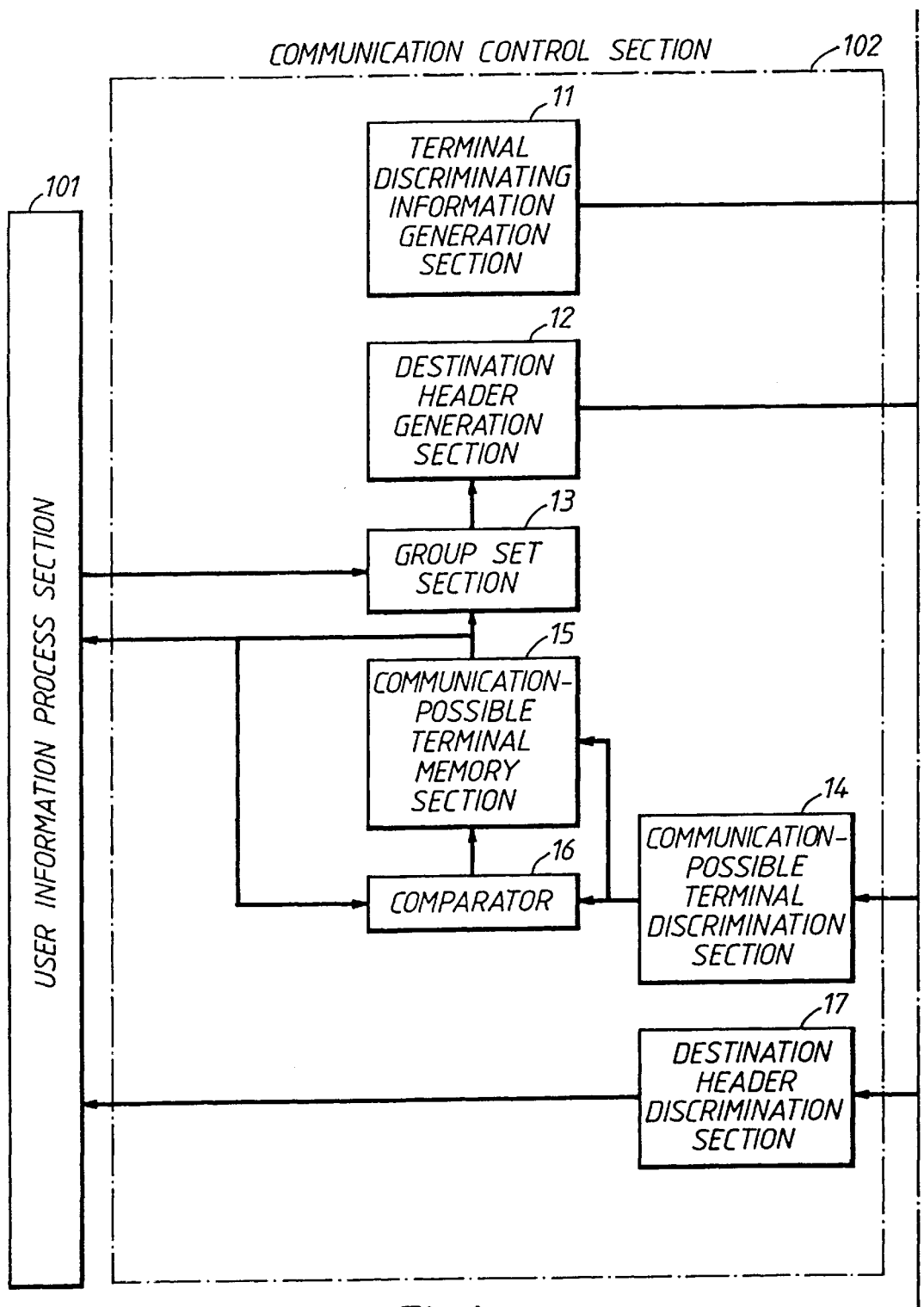
FIG. 1 is a block diagram of communication control apparatus according to a first embodiment.
Figure 1:
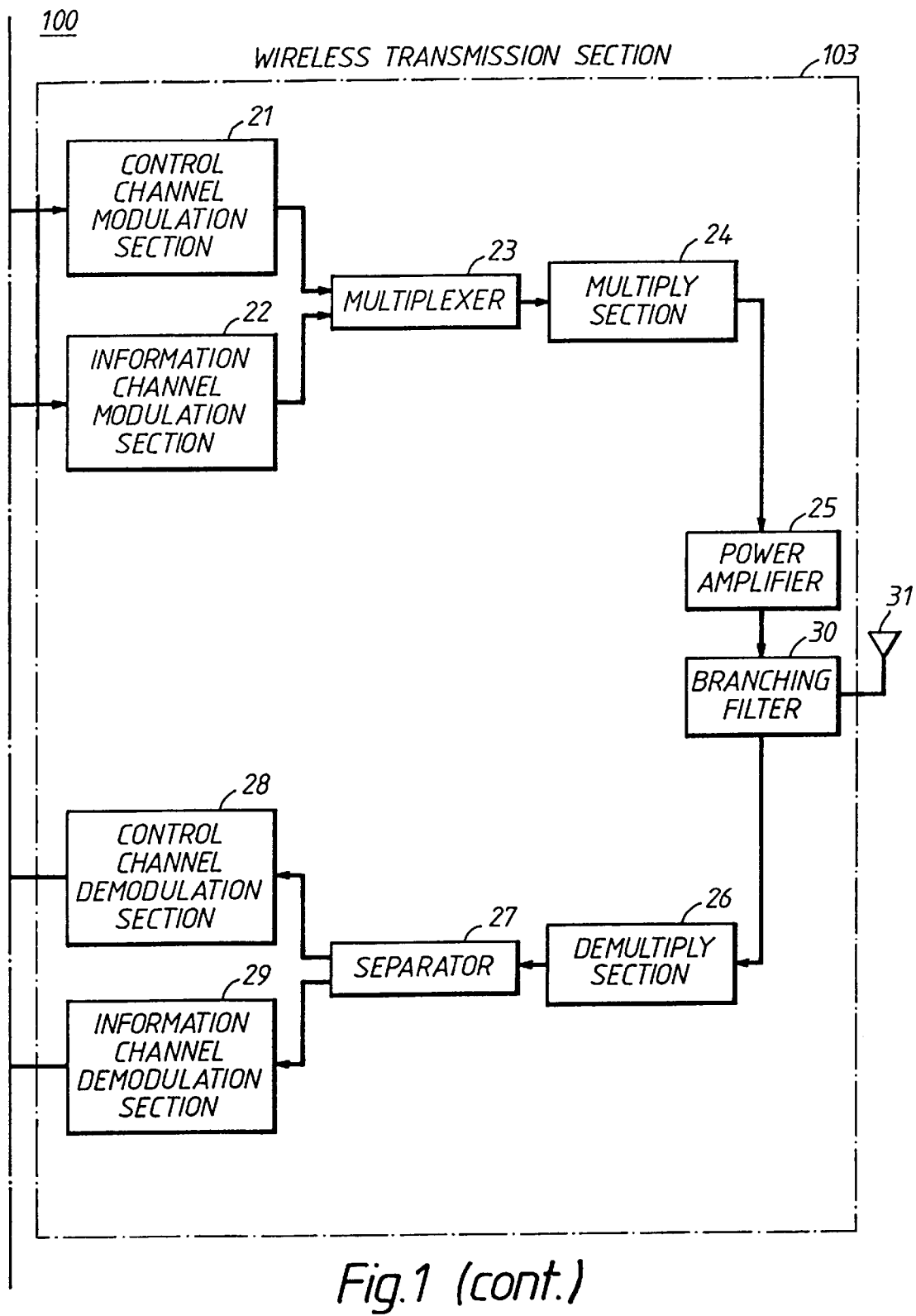

FIG. 1 is a block diagram of a communication control apparatus 100 according to a first embodiment. The communication control apparatus is used as portable information equipment i.e., terminal, and includes a user information process section 101, a communication control section 102, and a wireless transmission section 103. The user information process section 101 executes application-software (user-program). The communication control section 102 controls transmission (sending and receiving). The wireless transmission section 103 sends information generated from the user information process section 101 and the communication control section 102 by wireless transmission, and receives information sent by other communication control apparatuses.

The function of the communication control apparatus 100 will be explained in detail. A terminal discriminating information generation section 11 generates "self-terminal" discriminating information periodically. The self-terminal discriminating information is, for example, an identifier of the terminal itself and it is sent to a control channel modulation section 21. Sending user information is input from the user information process section 101 to a destination header generation section 12. Group designation information, which designates a group of terminals to send as sending user information, is simultaneously input from the user information process section 101 to a group set section 13. The group set section 13 outputs discriminating information of other terminals belonging to the group to the destination header generation section 12 in accordance with the group designation information. The destination header generation section 12 adds the discriminating information of the other terminals to the sending user information as a destination header, and outputs the information to the information channel modulation section 22.

An information channel for sending an information signal and a control channel for sending a control signal are channel-divided by frequency division. The information channel modulation section 22 and the control channel modulation section 21 modulate respectively according to each channel. Output signals from the information channel modulation section 22 and the control channel modulation section 21 are multiplexed by a multiplexer 23 and frequency-converted to high-frequency by a multiply section 24. The high-frequency signal is then amplified to a suitable power level by a power amplifier 25 and broadcast from an antenna 31 through a branching filter 30.

Various kinds of information signals from other terminals, which are received by the antenna 31, are changed from high-frequency to base-band signal by a demultiply section 26 through the branching filter 30, and separated by a separator 27. The output signal of separator 27 is respectively demodulated into receiving control information by the control channel demodulation section 28 and receiving user information by the information channel demodulation section 29.

The receiving user information signal is sent from the information channel demodulation section 29 to a destination header discrimination section 17. The destination header discrimination section 17 checks the destination header added to the information and decides whether the information's destination includes that terminal (the self-terminal) or not. If the destination is the self-terminal, the information is output to the user information process section 101. If the destination is not the self-terminal, the information is abandoned.

As noted above, the discriminating information of the self-terminal is sent and user information is transmitted among terminals which are set as members of the group. Group-setting is executed as follows. The terminal discriminating information generated from the terminal discriminating information generation section 11 is periodically sent from the antenna 31 through the wireless transmission section 103. The terminal discriminating information sent from other terminals is converted to a base-band signal by the demultiply section 26 through the branching filter 30 after being received by the antenna 31. The control channel signal is then separated by the separator 27 and sent to the control channel demodulation section 28. The terminal discriminating information demodulated by the control channel demodulation section 28 is output to the communication-possible terminal discrimination section 14. When the terminal discriminating information is output repeatedly at predetermined intervals, the communication-possible terminal discrimination section 14 decides that the other terminal corresponding to the terminal discriminating information is capable of communicating with the self-terminal. The terminal discriminating information is then output to the comparator 16 and the communication-possible terminal memory section 15.

The comparator 16 compares the information from the communication-possible terminal discrimination section 14 with the terminal discriminating information stored in the communication-possible terminal memory section 15. A control signal is output to the communication-possible terminal memory section 15 according to the comparison result. In the case that the comparison result is in coincidence, the control signal is not output because it is not necessary that the contents of the communication-possible terminal memory section 15 be updated. On the other hand, in the case that the comparison result is non-coincidence, the control signal is output to update the content of the communication-possible terminal memory section 15. In these ways, when an additional terminal (transmission control apparatus 100) comes near the self-terminal, a wireless transmission from each terminal is respectively received by the other terminal at a predetermined electric field strength. In short, the terminal discriminating information periodically sent from each terminal is respectively received by the other terminals and the terminal discriminating information is respectively written to the communication-possible terminal memory section 15. The content of the communication-possible terminal memory section 15 is sent to the user information process section 101 and the group set section 13. The user information process section 101 displays the terminal(s) corresponding to the content of the communication-possible terminal memory section 15, which is capable of communicating with the self-terminal. The user selects one terminal or plural terminals with which he wants to communicate and a setting order signal is output to the group set section 13. The group set section 13 creates a correspondence table between the selected terminal(s) and group according to the setting order signal.

In these ways, a logical communication link is set among the terminals belonging to the group. The logical communication link is formed by those terminals capable of communicating with each other (user who want to communicate with each other), which are set as members of the group, and the terminals of the group are automatically connected based on the situation of communication-possibility without the necessity of a special operation by the user.

In this case, plural groups may be set and the same terminal can be registered in plural groups. For example, in a case that five terminals'discriminating information (A1, A2, A3, A4, A5) are memorized in the communication-possible terminal memory section 15, the user information process section 101 can register three terminals (A1,A2,A3) as group BI and two terminals (A1,A4) as group B2. When the user information process section 101 generates data to be sent, the data is output to the destination header generation section 12 and group information (B1 or B2) is output to the group set section 13. Therefore, the data is multicast to the terminals belonging to the group.

When one of the other terminals departs from the communication range of the self-terminal, wireless transmission from each terminal with the moved terminal is not possible. The control process of this case will be explained in detail. The communication-possible terminal discrimination section 14 decides if the terminal discriminating information stored in the communication-possible terminal memory section 15 is continuously received within predetermined intervals. For example, if the terminal discriminating information is not received at all during a predetermined time, the communication-possible terminal discrimination section 14 decides that the other terminal corresponding to its particular terminal discriminating information is not capable of communicating with the self-terminal and erases the terminal discriminating information from the communication-possible terminal memory section 15. The user information process section 101 also decides that the other terminal is not capable of communicating with the self-terminal because the terminal discriminating information is not received from the communication-possible terminal memory section 15.

As noted above, it is possible for each terminal to communicate with each other terminal so long as these terminals come into communication proximity of one another. In short, the logical communication link is set for desired terminals anywhere, and it is erased automatically when these terminals are moved away from each other. It is not necessary for a user to previously know the opposite terminal's identifier (address number) and it is possible to connect with terminals of strangers. Multicast-communication (simultaneous connection service) is possible for plural terminals.

Figure 2:
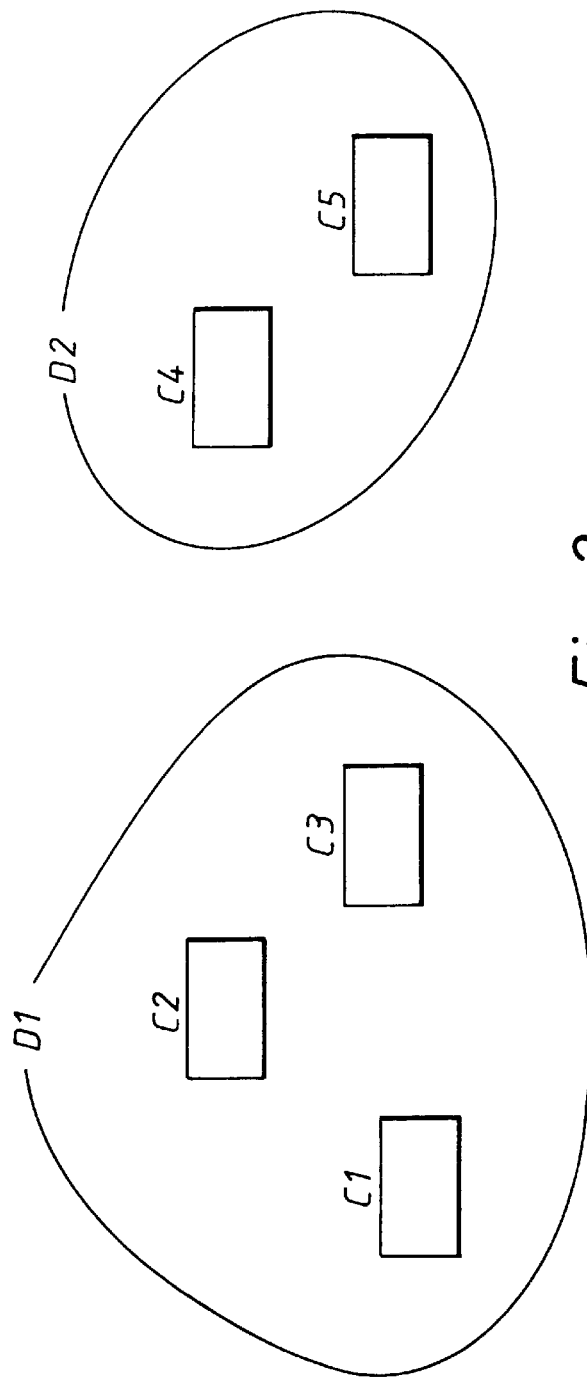
FIG. 2 is an example for use of portable information equipment for use with communication control apparatus.

In the communication control apparatus, a terminal in the area reached by wireless transmission is discriminated as a communication-possible terminal. If the area in which wireless transmission is possible is large, transmission throughput goes down because the wireless communication media is commonly used between plural groups. FIG. 2 shows an example of use of portable information equipment including the communication control apparatus 100. Group D1 includes terminals (C1,C2,C3) and group D2 includes terminals (C4,C5) Different logical communication links are set among terminals of group D1 and terminals of group D2. However, if these groups are located in the same area in which transmissions reach each other, the same wireless communication media is commonly used among the five terminals. On the other hand, if group D1 and group D2 are located in different areas so that transmissions do not reach each other, different wireless communication media are respectively used by each group.

The process for multicast-communication will now be explained in detail. In the conventional communication network, even if the same information is sent to plural terminals, plural separate transmissions of the information are necessary. For example, some facsimile apparatuses have a multicast function. In this case data is sent to plural apparatus in sequence. In short, sending N-times is necessary to send to apparatuses. In communication according to this embodiment, data is simultaneously sent to plural terminals. Therefore, it is possible to reduce the necessary number of sending times by adding a destination field to the data which is sent.

Figure 3:
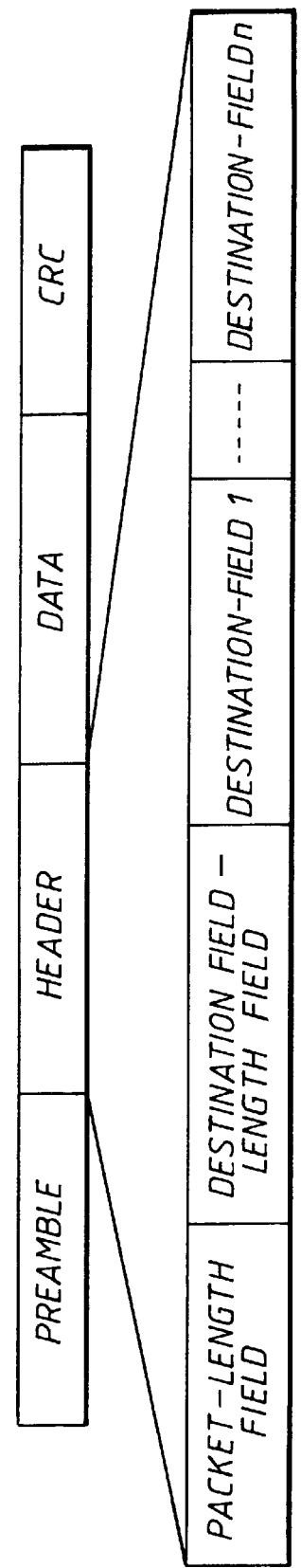
FIG. 3 is a format of sending-data.

In FIG. 2, group D1 includes terminals (C1,C2,C3). In this case, the group set section 13 of terminal C1 sets other terminals (C2,C3) as the same group. In the same way, the group set section 13 of terminal C2 sets other terminals (C1,C3) as the same group, and the group set section 13 of terminal C3 sets other terminals (C1,C2) as the same group. The data transmission among terminals (C1,C2,C3) is executed as follows. FIG. 3 shows a format of sending data. In a head portion of a packet, a preamble which indicates start portion of packet is added. As a method for discriminating the preamble, a special bit pattern is assigned to the preamble. If the same pattern as the special bit pattern is included in the packet except for the preamble, a spare dummy bit is added to the same pattern. In the next portion after the preamble, a header and data are added. As a last portion of the packet, a CRC bit for error detection is added. The header is comprised of a packet-length field, a destination field-length field and a destination field (one or plural). The packet-length field indicates a length of the whole packet. The destination field-length field indicates a number of terminals to which this packet is to be transmitted in multicast fashion. This signal also indicates a boundary between the destination field and the data. The destination field stores the terminal discriminating information of the terminals to which data is to be sent. In the group Dl of FIG. 2, when the terminal C1 sends data, the destination header generation section 12 adds the preamble, the header and CRC according to the group set section 13. The destination field-length field stores "2" because the data is to be multicast to two other terminals (C2,C3). The destination field contains the terminal discriminating information of terminals (C2,C3) respectively.

The operation of the destination-header discrimination section 17 of terminal (C2,C3) will now be explained. The destination-header discrimination section 17 reads values of the packet-length field and the destination field-length field when the packet header is detected from a receiving signal. Then, the value of each destination field, the number of which is indicated by the destination field-length field, is compared with the discriminating number of the self-terminal. If the discriminating number of the self-terminal coincides with one of the destination fields, the received packet is extracted. The destination-header discrimination section 17 decides whether the received packet includes an error by using CRC, and sends the received packet with the decision result to the user information process section 101. In this case, CRC is used to decide whether the received packet includes error or not. If error is detected in the received packet, the destination-header discrimination section 17 can request sending the received packet again. However, use of CRC is not necessary in the case of receiving data having a high-confidence degree.

In these ways, the terminal Cl multicasts data to plural terminals (C2,C3).

In the above-mentioned example, terminal discriminating information of each terminal is used in the destination field for sending multicast-data. However, after setting group D1, the group number is commonly set among terminals (C1, C2,C3) and the destination header generation section 12 may write the group number in the destination field. In this case, the destination field-length field is omitted, and the destination-header discrimination section 17 detects the group number.

By adding the terminal discriminating number or group number to the data, the data is sent by multicast to plural terminals in a one-time transmission. As a result, the data is transmitted efficiently. Therefore, it is convenient for large capacity data, such as image data.

Figure 4:
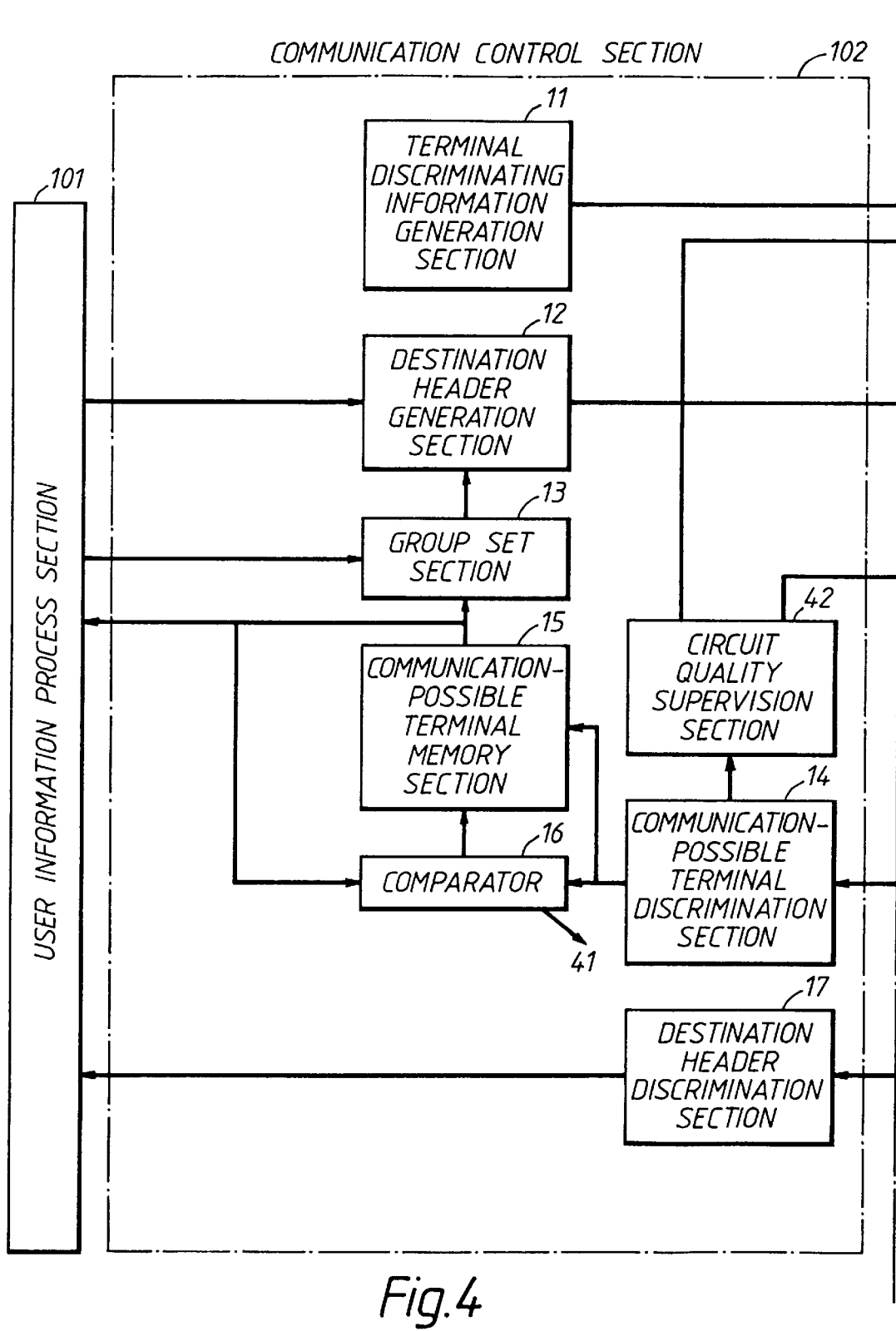
FIG. 4 is a block diagram of another communication control apparatus according to the first embodiment.
Figure 4:
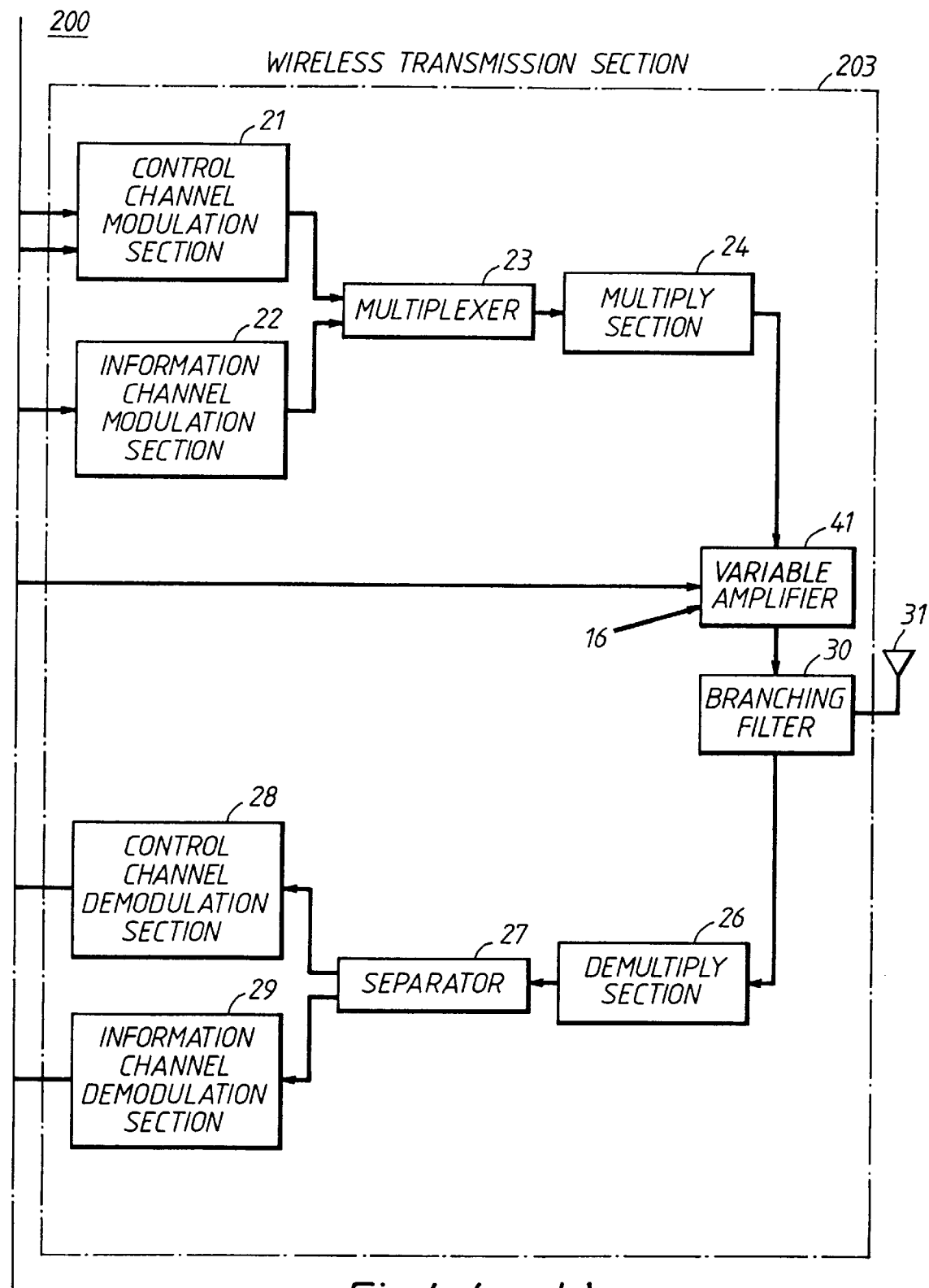

After the logical communication link is set among plural terminals, sending-power is preferably limited to be as small as possible within the limit of communicating among the plural terminals. If a terminal is moved away from another terminal during their communication, sending-power should be increased to prevent cutoff of the communication. FIG. 4 is block diagram including this function mentioned above. In FIG. 4, a wireless transmission section 203 differs from section 103 in that the power amplifier 25 in FIG. 1 is replaced by a variable amplifier 41 and a circuit quality supervision section 42 is added. In the same way as FIG. 1, when the communication-possible terminal discrimination section 14 detects the same terminal discriminating information within a predetermined Interval-and decides that it is a new terminal, the terminal discriminating information is supplied to the communication-possible terminal memory section 15 and the comparator 16. In this case, the comparator 16 outputs a power control signal to decrease the sending-power to the variable amplifier 41. The circuit quality supervision section 42 evaluates the circuit quality by calculating a number of error-bits included in the terminal discriminating information, and sends the circuit quality information to the terminal which sent the terminal discriminating information, through the control channel modulation section 21. The circuit quality is quality information for the transmission circuit from the other terminal to the self-terminal. On the other hand, the other terminal sends circuit quality information for the transmission circuit from the self-terminal to the other terminal. The circuit quality supervision section 42 receives the circuit quality information for the self-terminal through the control channel demodulation section 28 and the communication-possible terminal discrimination section 14. If the circuit quality is below a predetermined quality, the circuit quality supervision section 42 outputs a control signal to the variable-amplifier 41 to increase the sending-power. In short, circuit quality for the transmission circuit from the self-terminal to the opposite terminal is improved.

In these ways, when a new terminal capable of communicating with the self-terminal is detected, sending-power is gradually decreased in each terminal and the circuit quality is supervised for bi-directional transmission between the new terminal and the self-terminal. Accordingly, a predetermined circuit quality is maintained by teaching the circuit quality to the respective communicating terminals.

The circuit quality is checked as follows. The terminal discriminating information necessitates high reliability in general. Therefore, a CRC bit for error detection is added to the terminal discriminating information. Then, the received actual signal (terminal discriminating information) is first evaluated for error-correction and, second checked for whether an error is included or not by use of the CRC bit. If the circuit quality falls, the number of error-bits on transmission path will have increased. However, if an error-bit is not detected by the CRC-check, the error-bit on transmission path has already been corrected before the CRC-check. In this case, by comparing the received actual signal with the error-corrected signal, the error-bit on the transmission path is detected. Therefore, the circuit quality information is determined according to an error number of the error-bit.

In FIG. 1 and FIG. 4, the terminal discriminating information is sent periodically by each terminal. However, the terminal discriminating information may be sent according to a request sent by the opposite terminal. In this case, the terminal of the user who wants to communicate with other terminals, sends a request signal for terminal discriminating information of other terminals. Then, the other terminals, which receive the request signal, respectively send the terminal discriminating information of each terminal.

Group-setting is executed by a signal supplied from the user information process section 101. To enable easily setting a group, a terminal list whose terminals are capable of communicating with the self-terminal is displayed on the self-terminal and the user selects one terminal of plural terminals with which he wants to communicate.

In general, the terminal discriminating information is a unique binary number which is different for each terminal. It is convenient for text information, which can be rewritten, to be added to the terminal discriminating information. In short, the text information is added to the terminal discriminating information generated by the terminal discriminating information generation section 11 or the communication-possible terminal information stored in the communication-possible terminal memory section 15. The user information process section 101 displays the text information with the communication-possible terminal information. In this way, the user can easily select the text information (for example, other user's name) displayed on his terminal and the logical communication link is set between his terminal and the other terminal with which the user wants to communicate.

The wireless transmission section 103 can be replaced by wired transmission. In this case, the portable information equipment (the communication control apparatus 100) is a communication-possible terminal if it is connected to other terminals by wire.

A second embodiment of the present invention will now be described.

Terms used for explanation of the second embodiment are defined as follows.

"Self-terminal" is a particular communication control terminal (as discussed above). "Other terminal" or "another terminal" is any other communication control terminal except for the self-terminal. "Terminal-name" is a discriminating name of each communication control terminal, for example, a physical identifier. "Attribute" is data such as transmission error rate. "Terminal-information" is data of the self-terminal, which is the terminal-name and attribute. "Collected-information" is terminal-information received from other terminals. "Terminal-restricted information" is information of another terminal capable of communicating with the self-terminal. "Information" is terminal-information, collected information and terminal-restricted information.

Figure 5:
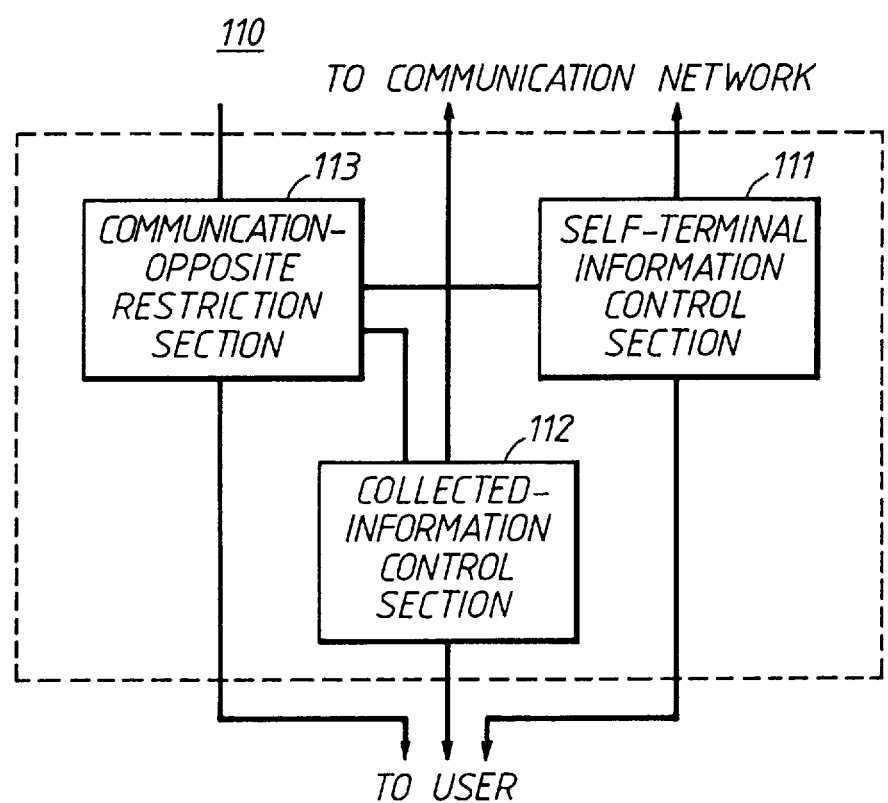
FIG. 5 is a block diagram of the communication control section of a first example according to a second embodiment.

FIG. 5 is a block diagram of a communication control section 110 according to the second embodiment. The communication control section 110 corresponds to the communication control section 102 in FIG. 1, and includes a self-terminal information control section 111, a collected-information control section 112 and a communication-opposite restriction section 113. The self-terminal information control section 111 processes terminal-information, sends the terminal-information to other terminals and has a terminal-information management table for storing physical identifier and attribute data as shown in FIG. 6A. The collected information control section 112 processes collected information, sends the collected information to other terminals and has a collected-information management table. The collected-information management table stores physical identifier and attribute data with respect to other terminals' physical identifiers, which is capable of communicating with each terminal of corresponding physical identifier in collected-information as shown in FIG. 6B. The communication-opposite restriction section 113 restricts other terminals from being capable of communicating with the self-terminal in accordance with the terminal-information and the collected-information. The communication-opposite restriction section 113 manages terminal-restricted information, sends the terminal-restricted information to other terminals and stores a restricted-information management table for storing physical identifier of a restricted-terminal and attribute data as shown in FIG. 6C.

Processing of the communication control section 110 will now be explained. The self-terminal information control section 111 discriminates other terminals which are capable of communicating with the self-terminal according to identifier information received from other terminals and stores each other terminal's identifier as terminal information (including the self-terminal's identifier). The collected-information control section 112 updates the collected information according to received collected information from other terminals. The communication-opposite restriction section 113 restricts other terminals from communicating with the self-terminal according to the terminal-information stored in the terminal information control section 111 and the collected-information stored in the collected-information control section 112, whenever the collected-information control section 112 updates the collected-information. The communication-opposite restriction section 113 then stores a list of terminal-restricted information and sends the list to other terminals An example of the restriction method of the communication-opposite restriction section 113 will be explained. The terminal-information management table and the collected-information management table store physical identifiers for discrimination. In this case, the physical identifier of the self-terminal is 5.

(1) Information of the terminal information management table is used as follows. First, a terminal array for discrimination (FIG. 7A) is formed according to physical identifiers 1,3,5,7 in the terminal information management table shown in FIG. 6A. The terminal array for discrimination includes an element position corresponding to each physical identifier. Self-terminal information "o" is written in element position of the physical identifier 5.

(2) Information of the collected information management table is used as follows. In the terminal array for discrimination of the sending physical identifier 1,3,7 (FIG. 6B), attribute "A" or "B" is written in the element position corresponding to the physical identifier of the collected information shown in FIG. 7A.

(3) "φ" is written in blank positions of the terminal array for discrimination.

(4) After writing the information, the attributes of element array 1,3,5,7 are compared with each other. The logical result of attributes of the same element position for all terminals' array is calculated according to a logical relational chart (FIG. 7B) and logical equation (FIG. 7C). In this case, "o" is the self-terminal's attribute. "A" is another terminal's attribute of excellent quality for communicating with the self-terminal. "B" is another terminal's attribute of good quality for communicating with the self-terminal. "φ" is another terminal's attribute indicating that the self-terminal cannot communicate. Therefore, as shown in FIG. 7C, an attribute of bad quality between two attributes to be calculated is selected as the logical result. For example, as shown in FIG. 7A, the logical result of element position 1 is "A", the logical result of element position 5 is "B" and the logical result of the other element positions are all "φ". Therefore, the terminal-restricted information is physical identifier 1,5. In short, terminal 1 and terminal 5 (the self-terminal) can communicate with each other from among terminals 1,3,5,7. The terminal-restricted information is stored in the restricted-information management table.

Figure 8:
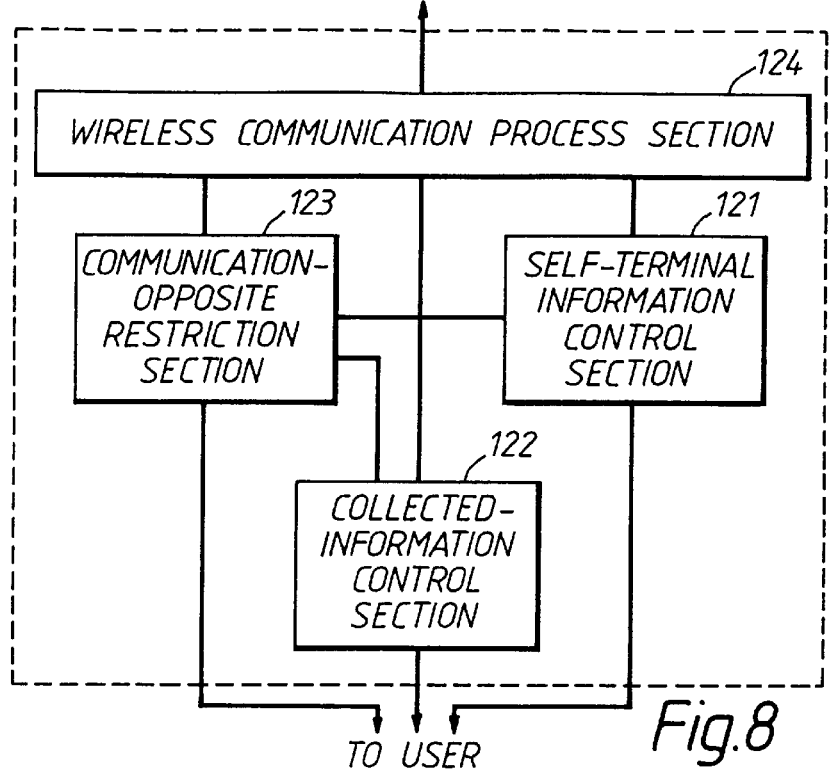
FIG. 8 is a block diagram of a communication control section of a second example according to the second embodiment.

A second example of a communication control section according to the second embodiment will now be explained. FIG. 8 shows a block diagram of a communication control section 120 of the second example. The communication control section 120 includes a self-terminal information control section 121, a collected-information control section 122, a communication-opposite restriction section 123 and a wireless communication process section 124. The wireless communication process section 124 sends information received from a wireless network to the self-terminal information control section 121, the collected-information control section 122 and the communication-opposite restriction section 123, and transmits information received from the self-terminal information control section 121, the collected-information control section 122 and the communication-opposite restriction section 123 to the wireless network.

Figure 9:
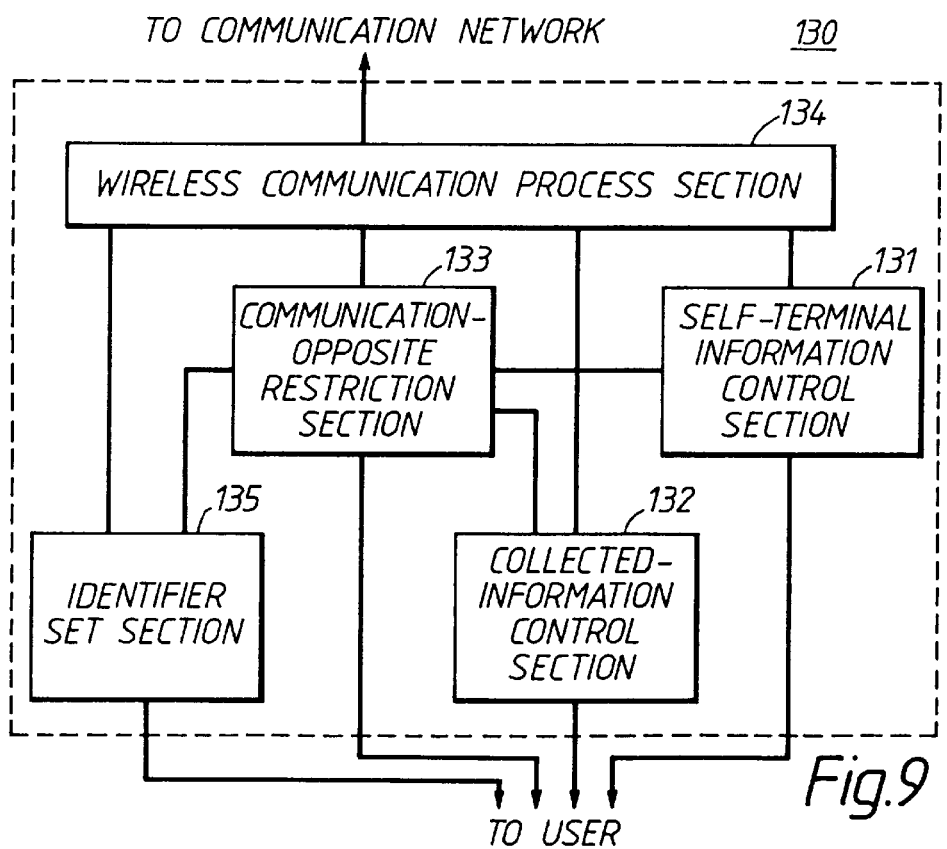
FIG. 9 is a block diagram of a communication control section of a third example according to the second embodiment.

A third example of a communication control section according to the second embodiment will now be explained. FIG. 9 shows a block diagram of a communication control section 130 of the third example. The communication control section 130 includes a self-terminal information control section 131, a collected-information control section 132, a communication-opposite restriction section 133, a wireless communication process section 134 and an identifier set section 135. The identifier set section 135 processes as follows (periodically, when the collected-information is updated, or when a user's instruction is supplied).

(1) In the case that the communication-opposite restriction section 133 restricts a group of terminals, the identifier of each terminal and multicast identifier of the group are selected as terminal-identifier information. The identifier set section 135 stores the terminal-identifier information and sends it to the wireless communication process section 134 to distribute to other terminals. The terminal-identifier information is updated according to terminal-restricted information stored in the communication-opposite restriction section 133.

(2) In the case that the terminal-restricted information is received from the wireless communication process section 134, the identifier of each terminal and multicast identifier of the group is set according to the terminal-restricted information. The terminal-identifier information is updated according to the terminal-restricted information stored in the communication-opposite restriction section 133.

FIG. 10 shows a table for storing terminal-identifier information in the identifier set section 135. The table stores information as follows.

group-identifier for a group consisting of each terminal
group-identifier for plural terminals in the group (a part of the group i.e., a sub-group)
physical identifier of each terminal included in each group
present name for user of the group For example, if a user requests setting a group-identifier to a part of group, the group-identifier corresponding to the part of the group is set.

As shown in FIG. 10, group-identifier "01.00.00.00" of the group consisting of three terminals "001", "003", "007" is set. Group-identifier "01.00.02011" of terminal "001", group-identifier "01.00.02.02" of terminal "003" and group-identifier "01.00.03.01" of terminal "007" are set respectively. If the user requests setting the group-identifier for two terminals "001,003", the group-identifier "01.00.02.00" and its present name "Sub Group-A" are set.

Figure 11:
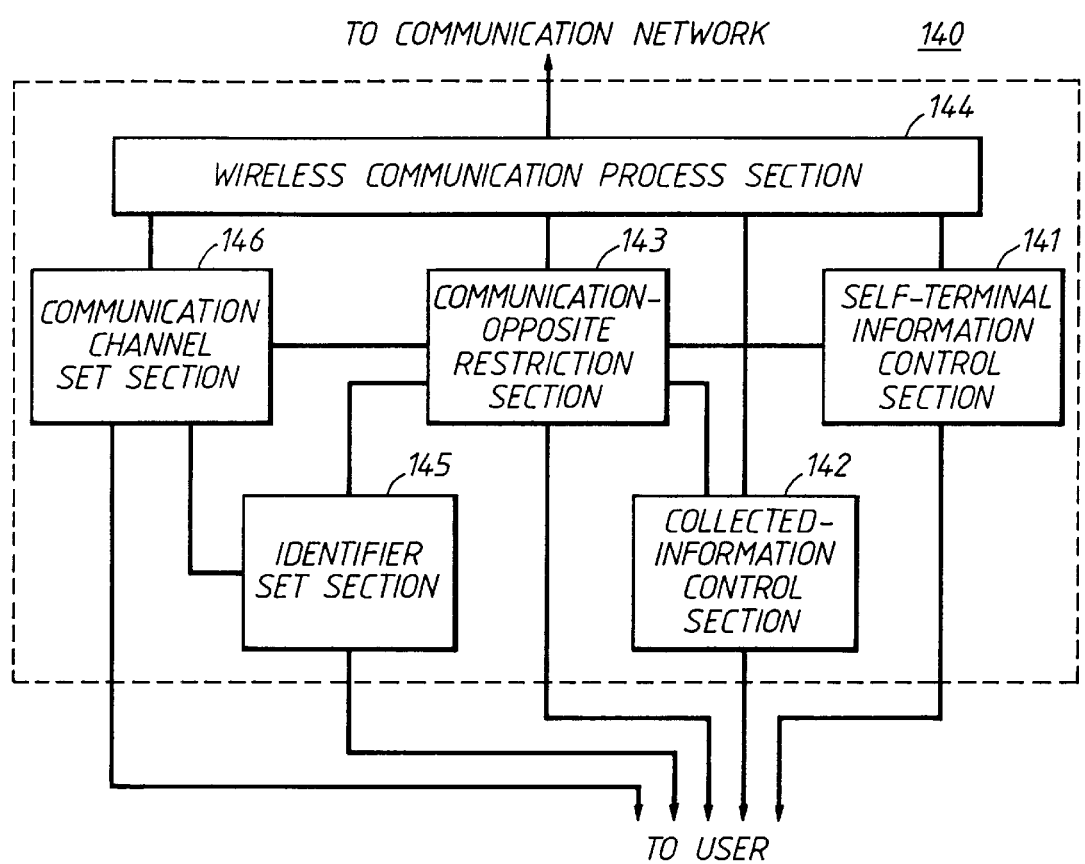
FIG. 11 is a block diagram of a communication control section of a fourth example according to the second embodiment.

A fourth example of communication control section according to the second embodiment will now be explained. FIG. 11 shows a block diagram of a communication control section 140 of the fourth example. The communication control section 140 includes a self-terminal information control section 141, a collected-information control section 142, a communication-opposite restriction section 143, a wireless communication process section 144, an identifier set section 145 and a communication channel set section 146. The communication channel set section 146 processes as follows (periodically, when the collected-information is updated, or when a user's instruction is supplied).

(1) As for terminals restricted by the communication-opposite restriction section 143 in the self-terminal, a communication channel for restricted terminals is set to be monopolized or be given priority and the communication channel set information is sent to the wireless communication process section 144. The communication channel set information is updated according to the terminal-restricted information stored in the communication-opposite restriction section 143 and the identifier set section 145.

(2) If communication channel set information is received from the wireless communication process section 144, a communication channel for restricted terminals is set to be monopolized or be given priority and the communication channel set information is sent to the wireless communication process section 144. The communication channel set information is updated according to the terminal-restricted information stored in the communication-opposite restriction section 143. FIG. 12 shows a table for storing group-identifier and corresponding communication channel information. The table stores the communication channel used in accordance with the group-identifier.

Figure 13:
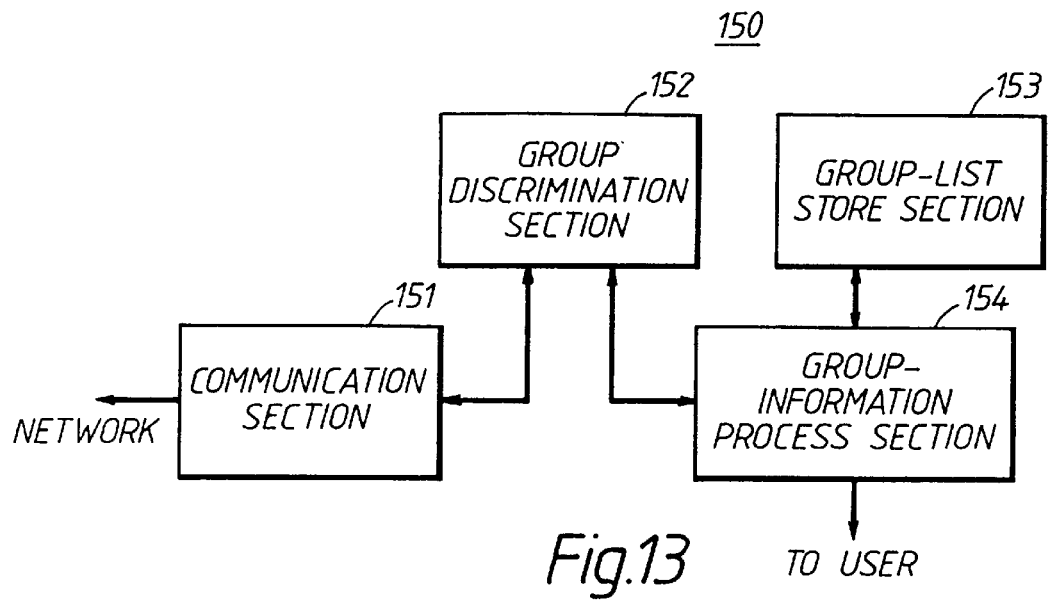
FIG. 13 is a block diagram of a communication control section of a fifth example according to the second embodiment.

A fifth example of a communication control section according to the second embodiment will be explained. FIG. 13 shows a block diagram of communication control section 150 of the fifth example. The communication control section 150 includes a communication section 151, a group discrimination section 152, a group-list store section 153 and a group-information process section 154. The communication section 151 sends information from the network to the group discrimination section 152, and sends information generated from the group discrimination section 152 to the network. The group discrimination section 152 discriminates other terminals which are capable of communicating with the self-terminal as a group. The function is similar to that of examples 1~4 as described above. The group-list store section 153 stores group information received from the group discrimination section 152. The group-information process section 154 receives the group discrimination information from the group discrimination section 152 and transmits the group discrimination information to the terminal user.

The processing of the communication control section will now be explained in detail.

(1) The group discrimination section 152 sets a group-identifier to terminals restricted by the self-terminal as a group. A request for storing the group-list consisting of the group-identifier and each terminals identifier in the group is then sent to the group-information process section 154.

(2) The group-information process section 154 controls the group-list store section 153 to store the group-list.

(3) If the restricted terminals are updated by the group discrimination section 152, the group-identifier and each terminal's identifier in the group are updated if necessary. A request for storing a new group-list consisting of the updated group-identifier and each terminal's identifier is then sent to the group-information process section 154.

(4) The group-information process section 154 has the group-list store section 153 store the new group-list.

(5) When a request for storing the group-list is received, the group-information process section 154 informs the terminal's user of the group-list stored in the group-list store section 153.

Figure 14:
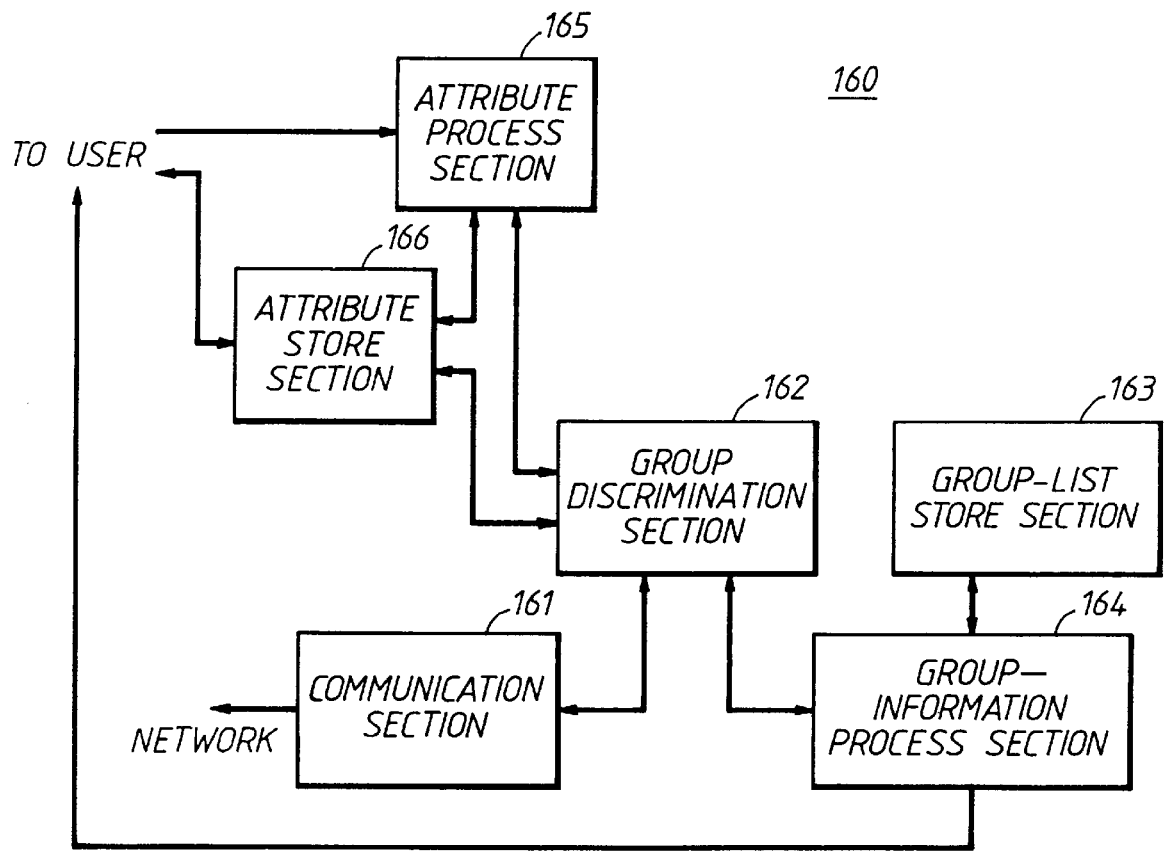
FIG. 14 is a block diagram of a communication control section of a sixth example according to the second embodiment.

A sixth example of a communication control section according to the second embodiment will be explained. FIG. 14 shows a block diagram of a communication control section 160 of the sixth example. The communication control section 160 includes a communication section 161, a group-discrimination section 162, a group-list store section 163, a group-information process section 164, an attribute process section 165 and an attribute store section 166. A different feature of the sixth example compared with the fifth example is that the group discrimination section 162 transfers an attribute to the attribute process section 165 and the attribute store section 166 when the attribute is received, and transfers the attribute to the communication section 161 when a request for transferring the attribute to an other terminal is received from the attribute process section 165.

The attribute process section 165 processes attribute data which the group discrimination section 162 receives from the communication section 161, and controls the attribute store section 166 to store the attribute (including process result). The attribute store section 166 stores the attribute under control of the attribute process section 165. In this case, the group discrimination section 162 receives the attribute data (application and communication quality), which are used by restricted terminals of the group, from the communication section 161 through the network. The attribute is then stored in the attribute store section 166 under control of the attribute process section 165. When the restricted terminals are updated, a group-identifier and each terminal's identifier in the group are updated if necessary. A request for updating attributes of terminals included in the updated group is then sent to the attribute process section 165. When the request is received, the attribute process section 165 has the attribute store section 166 store the updated attribute. When the group-list is updated or a request is supplied by user, the attribute process section 165 informs the user of the group-list updated in the attribute memory section 166 and requests transferring the attribute to other terminals for the group discrimination section 162.

A third embodiment of the present invention will now be described.

Figure 15:
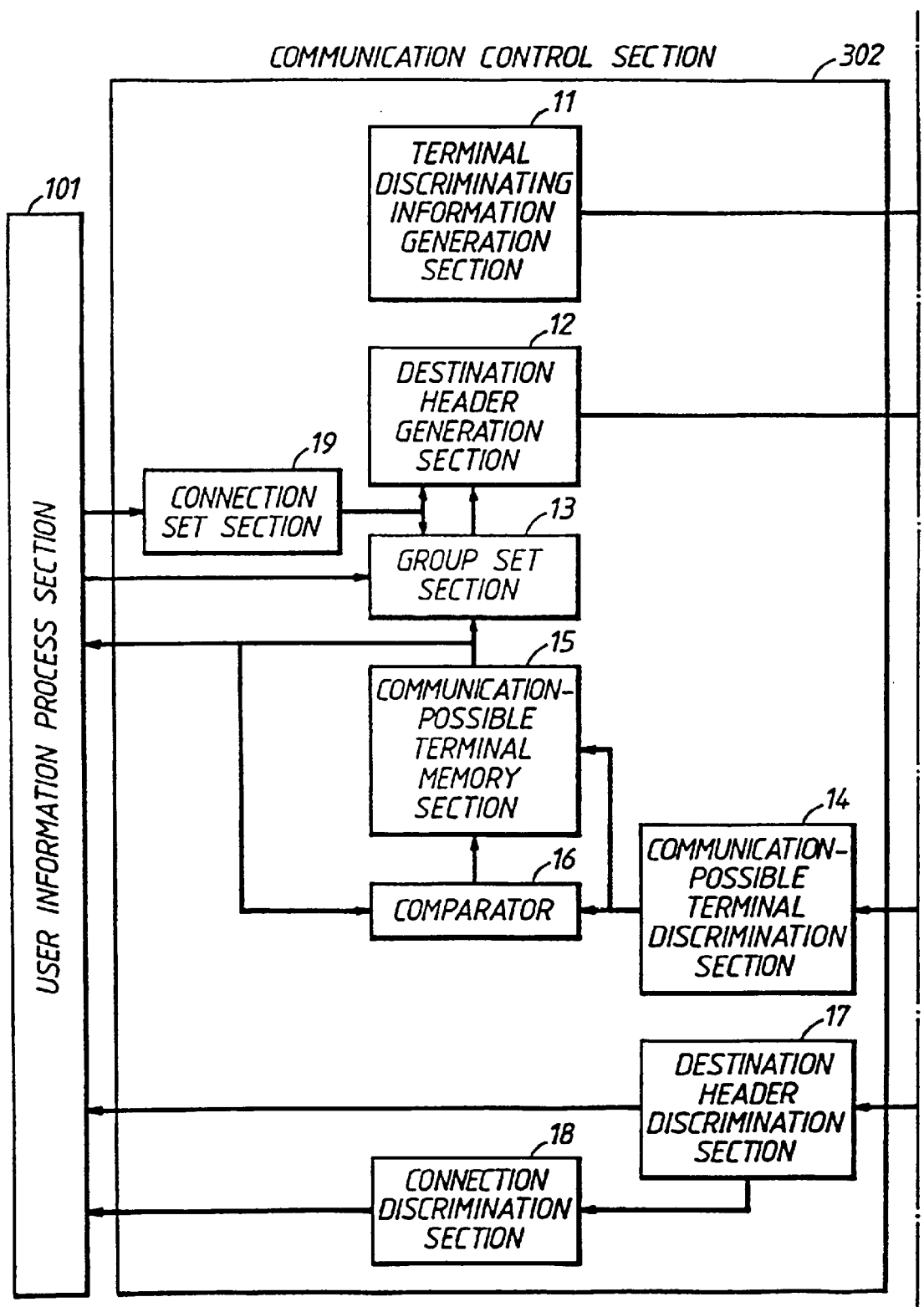
FIG. 15 is a block diagram of communication control apparatus according to a third embodiment.
Figure 15:
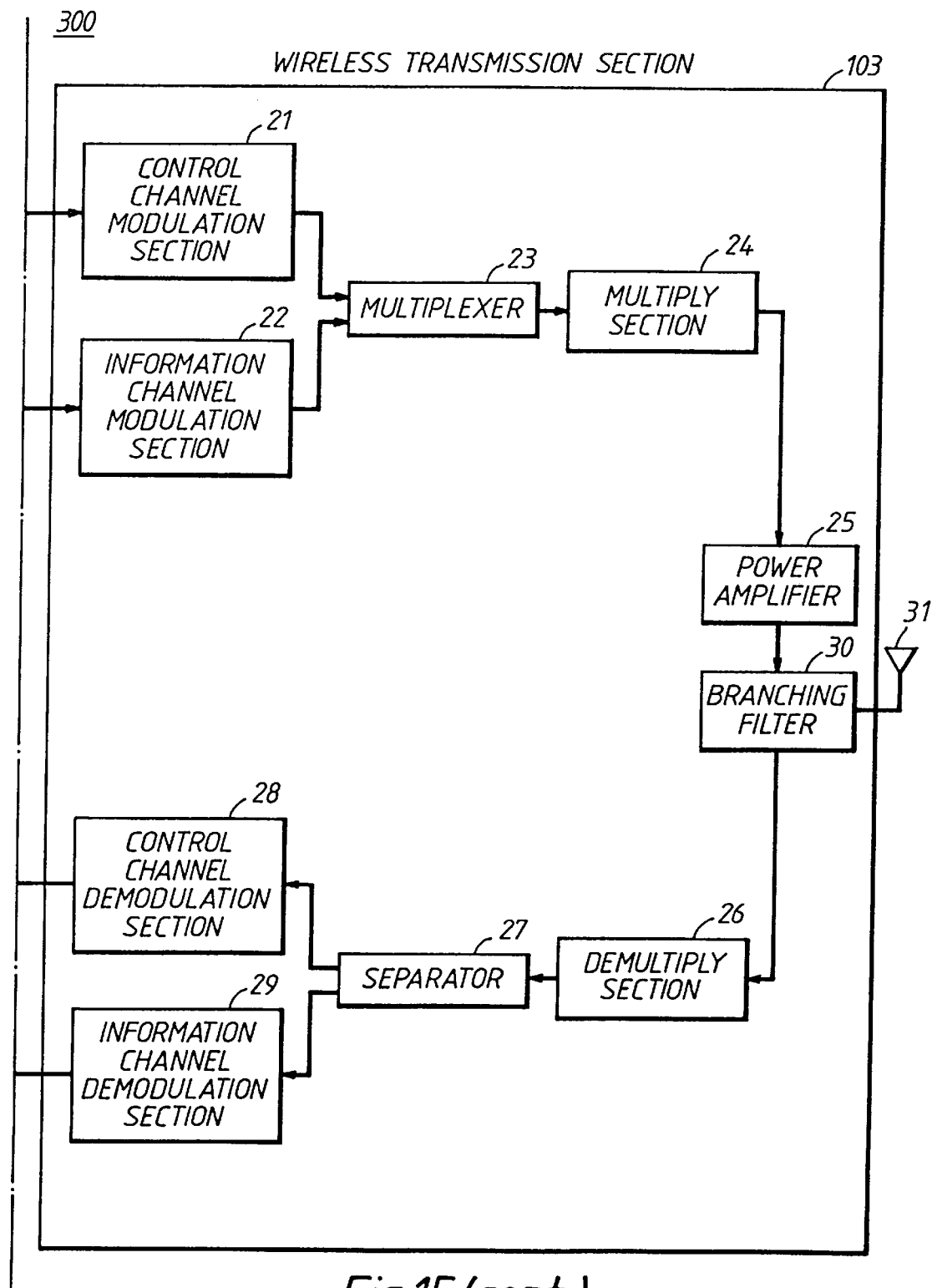

FIG. 15 is a block diagram of communication control apparatus 300 corresponding to the communication control apparatus 100 in FIG. 1, and like elements are identified by the same reference numerals. In FIG. 15, the user-information process section 101 executes an application program. A communication control section 302 controls transmission (sending and receiving). The wireless transmission section 103 transmits various kind of control information generated from the communication control section 302 and user-information generated from the user-information process section 101 by transmission. According to the communication control apparatus 300, plural MMCs (multipoint-to-multipoint connections) are set for transmitting data among plural portable information devices when the portable information devices are within a predetermined range of each other.

First, self-terminal discriminating information is periodically generated by the terminal discriminating information generation section 11. The terminal discriminating information is sent to the control channel modulator 21. The user-information process section 101 outputs user-information to the destination header generation section 12. At the same time, the user-information process section 101 outputs a group-set order to set a group which receives the user-information to the group set section 13, and outputs connection set information to set a communication connection with which the user-information is transmitted to a connection set section 19. The connection set section 19 outputs connection discriminating information to the destination header generation section 12 according to the connection set information, and outputs group-set information to the group set section 13. The group set section 13 outputs opposite-terminal discriminating information in the group to the destination header generation section 12 according to the group-set information and the group-set order. The destination header generation section 12 adds the opposite-terminal discriminating information to the user-information as a destination header, and outputs the destination header to the information channel modulation section 22. The information channel for sending information signals and control channel for sending control signals are channel-separated by frequency division.

The information channel modulation section 22 and the control channel modulation section 21 execute the modulation according to respective channels. Output signals from the information channel modulation section 22 and the control channel modulation section 21 are multiplied by the multiplexer 23, converted to high frequency by the multiply section 24, amplified to suitable power by the power amplifier 25 and sent in multicast fashion by the antenna 31 through the branching filter 30.

Information signals from other terminals are received by the antenna 31, converted from high frequency to base-band by the demultiply section 26 through branching filter 30, and separated by the separator 27. An output signal is demodulated to receiving-control information by the control channel demodulation section 28 and demodulated to receiving-user information by the information channel demodulation section 29. The destination header added to the receiving-user information is checked by the destination header discrimination section 17 to decide whether the destination of the receiving-user information includes that particular terminal, i.e., the self-terminal. If it includes the self-terminal, the receiving-user information is output to the user-information process section 101. If it does not include the self-terminal, the receiving-user information is abandoned. The receiving-user information is output from the destination header discrimination section 17 to a connection discrimination section 18. The connection discrimination section 18 checks the destination header added to the receiving-user information and outputs discriminating information of a connection belonging to the receiving-user information to the user-information process section 101.

The processing of group-setting is the same as in the first embodiment, and therefore an explanation thereof is omitted. A particular feature of the third embodiment is connection-setting. The user-information process section 101 selects a group being set by the group set section 13 and outputs a connection set signal to the connection set section 19. The connection set section 19 creates a correspondence table between group discriminating information and connection discriminating information according to the connection set signal. When the user-information process section 101 sends user data, the user-information is output to the destination header generation section 12 and a group-set signal of opposite-terminals is output to the group set section 13. Therefore, the user-information is multicast to other terminals belonging to the group.

FIG. 16 shows a group-management table stored in the group set section 13. The group-management table is comprised of a group-identifier, a number of terminals of the group, and terminal-identifiers (terminal discriminating information) of the group. Because the group-management table stores the terminal-identifier of each group-identifier, it is convenient for the self-terminal to identify the group which includes particular terminals and to delete a terminal which cannot communicate with the self-terminal FIG. 17 shows a connection-management table stored in the connection set section 19. The connection-management table is comprised of a group-identifier, a number of connections (MMC) of the group and connection-identifiers of the group. The connection is a kind of network for transmitting one type of media, and the connection identifier is set to each connection. Therefore, the number of connections represents plural kinds of networks, which respectively transmit plural media, such as image data, sound data, text data and so on.

Figures 18, 20:
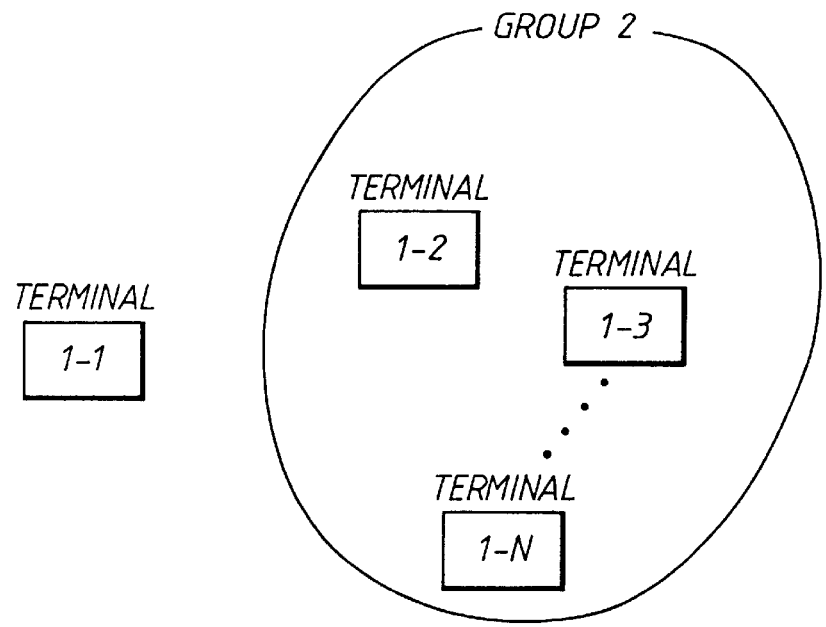
FIG. 18 is an example of a group being formed by plural terminals.
FIG. 20 is a table for storing a sending-sequence number of a self-terminal and confirmation-sequence number and receiving-sequence number of opposite terminals.
Figure 19:
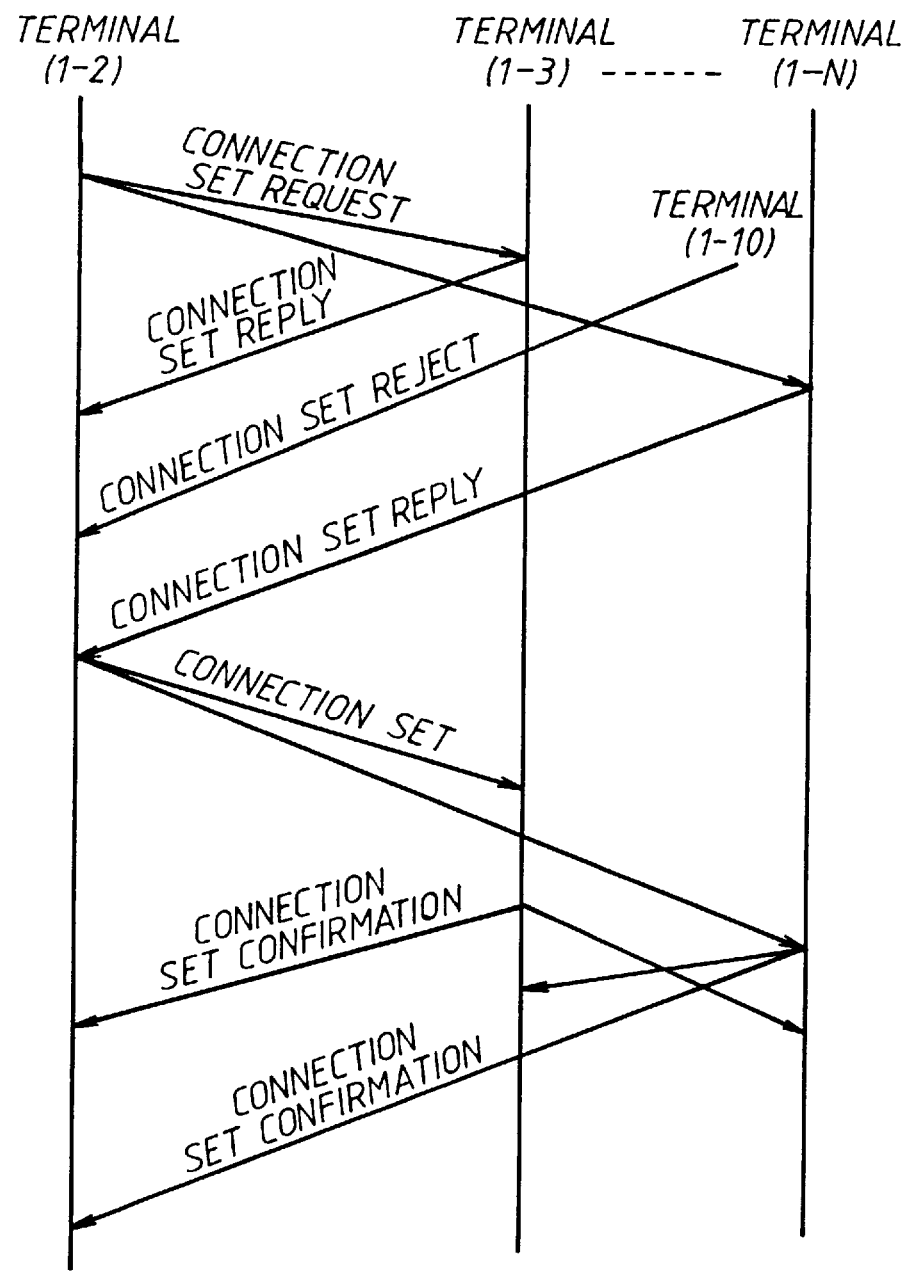
FIG. 19 is a time chart of connection setting for plural terminals.

A connection-set method will be explained with reference to FIGS. 18 and 19. As shown in FIG. 18, it is assumed that terminal (1-2) sets connection to other terminals in group 2 (from terminals (1-3) to terminal (1-N)). FIG. 19 shows time chart of connection setting.

(1) Terminal (1-2) sends a connection set request message to each of the terminals (1-3~N). The connection set request message includes a terminals list for setting connection (in this case, terminals (1-3~N) and an initial sequence number which is given to first data sent by terminal (1-2).

(2) When the other terminals (1-3~N) receive the connection set request message, the other terminals send a connection set reply message to terminal (1-2) in case of agreement and send a connection set reject message to terminal (1-2) in case of disagreement. The connection set reply message includes an initial sequence number which was given to the first data sent by the terminal that sent the message.

(3) It is assumed for example that terminal (1-2) receives the connection set reply messages from terminals (1-3~9,11~N) and receives the connection set reject message from terminal (1-10). Terminal (1-2) then sends a connection set message to the terminals (1-3~9,11~N). The connection set message includes a list of terminals which agree with connection setting and the initial sequence number of each terminal in the list.

(4) When the other terminals (1-3~9,11~N) receive the connection set message, each respective terminal (1-3~9, 11~N) sends a connection set confirmation message to the other terminals in the list.

(5) When each respective terminal receives all connection set confirmation messages from other terminals in the list, the connection setting is completed and a logical communication connection is set among terminals (1-2~9,11~N).

(6) The terminals (1-2~9,11~N) can send data.

After setting the connection, each terminal creates a table for storing a sending-sequence number for itself, a confirmation-sequence number and a receiving-sequence number for other terminals as shown in FIG. 20. The sending-sequence number is a number which is given to data sent by the terminal itself.

In the case that terminal (1-2) creates the list, the sending-sequence number is set as the initial sequence number in the connection set request message sent by terminal (1-2). In the case that one of terminals (1-3~9,11~N) creates the list respectively, the sending-sequence number is set as the initial sequence number in the connection set reply message sent by such terminal (1-3~9,11~N). When each terminal (1-2~9,11~N) sends data, the sending-sequence number is given to the data and the sending-sequence number is incremented by 1.

The confirmation sequence number is a sequence number given to data which the self-terminal sends to another terminal and the other terminal sends a receiving-confirmation signal to the self-terminal. The confirmation sequence number is initialized as a number smaller by 1 than the initial number in the connection set request message being sent by terminal (1-2) in the case that terminals (1-3~9,11~N) create the table respectively, and the confirmation sequence number is initialized as a number which is smaller by 1 than the initial number in the connection set reply message being sent by terminals (1-3~9,11~N) in the case that terminal (1-2) creates the table.

Figure 21:
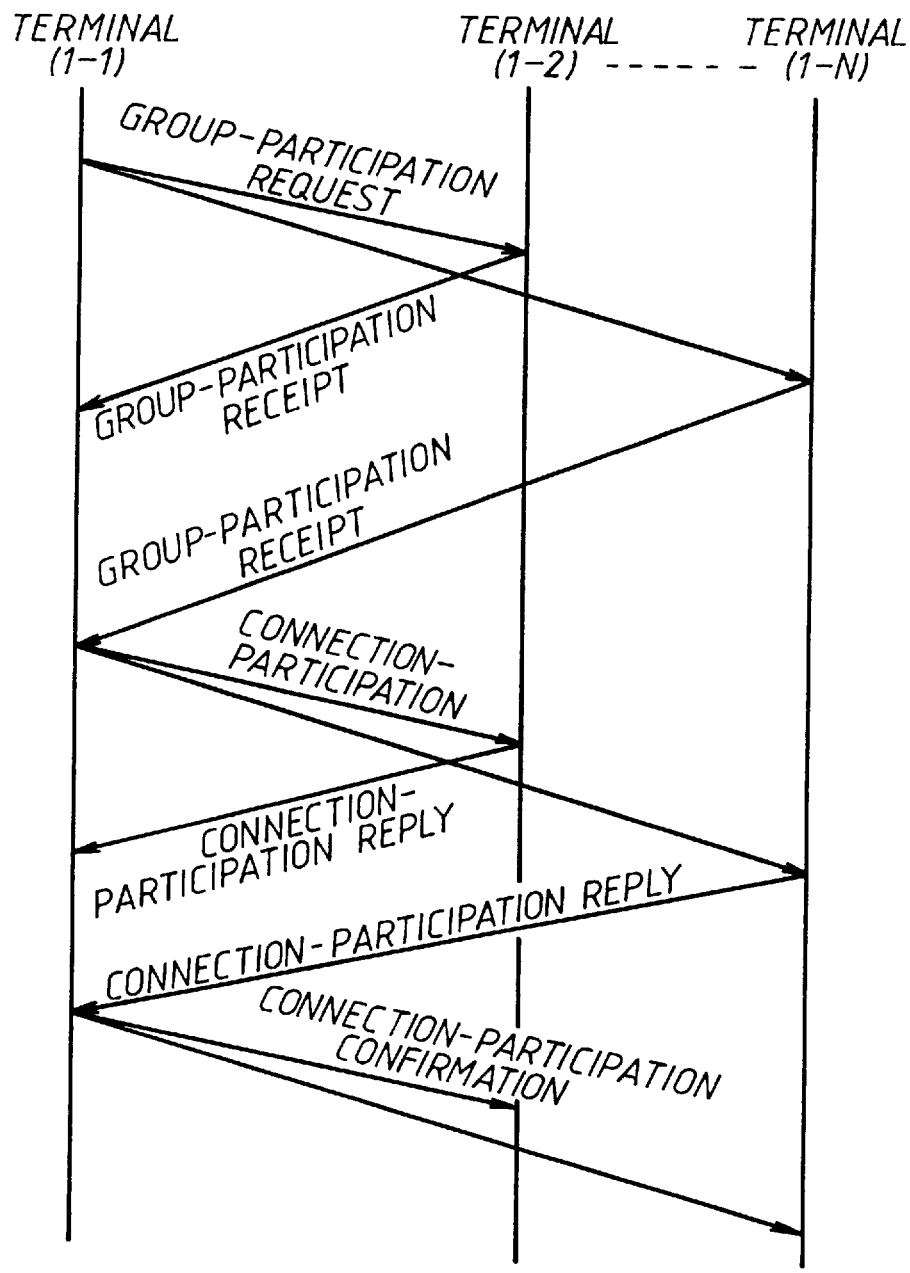
FIG. 21 is a time chart for participation of a new terminal in a group.

The receiving-sequence number is a sequence number given to data, which the self-terminal receives from another terminal and the self-terminal sends a receiving-confirmation signal to the other terminal. The receiving-sequence number is initialized as the initial sequence number in the connection set reply message sent by terminals (1-3~9,11~N) in the case that terminal (1-2) creates the table, and the receiving-sequence number is initialized as the initial sequence number in the connection set message being sent by terminal (1-2) in the case that terminals (1-3~9, 11~N) create the table respectively. When the self-terminal receives data from another terminal, based upon which the sequence number of the data coincides with the receiving-sequence number of the other terminal in the list, the self-terminal decides that the data is correct and sends a receiving-confirmation to the other terminal Second, a method by which a new terminal participates in the group will be explained. In FIG. 18, it is assumed that terminals (1-2~N) form group 2 and connections (1~M) are set among the terminals (1-2~N) Now, new terminal (1-1) participates in group 2. FIG. 21 shows a time chart for new terminal (1-1) participating in group 2.

(1) When the user-information process section 101 in terminal (1-1) outputs a request for participating in group 2, the group set section 13 in terminal (1-1) sends a group-participation request message to terminals (1-2~N) which belong to group 2.

(2) When terminals (1-2~N) receive the group-participation request message, each group set section 13 of terminals (1-2~N) reads out the connection set identifier of group 2 in the connection management table (as shown in FIG. 17) from the connection set section 19, and sends a group-participation receipt message including the connection identifier to terminal (1-1).

(3) When terminal (1-1) receives the group-participation receipt message, the group set section 13 of terminal (1-1) creates an item of new group 2 in the group management table (as shown in FIG. 16) and outputs the connection identifier to the connection set section 19.

(4) When the connection set section 19 of terminal (1-1) receives the connection identifier, the connection set section 19 sends a connection participation message to terminals (1-2~N). The connection participation message includes an initial value of sending-sequence number of each connection identifier, to which terminal (1-1) gives the sending-sequence number to first data when terminal (1-1) sends the first data through each connection.

(5) When terminals (1-2~N) receive the connection participation message, the terminals (1-2~N) sends a connection participation reply message. The connection participation reply message being sent by terminal (1-2~N) includes an initial sequence number of each connection identifier, to which terminal (1-2~N) gives the initial sequence number to first data when each of terminal (1-2~N) sends the first data to terminal (1-1) through each connection.

(6) When the connection set section 19 of terminal (1-1) receives all connection participation reply messages from terminals (1-2~N), the connection set section 19 sends a connection participation confirmation message to terminals (1-2~N)

After setting the connection, data exchange is begun between terminals.

(1) When each of terminals (1-2~N) sends data to another terminal in group 2, the sending-sequence number and confirmation-sequence number being sent by the other terminal are given to the first data.

(2) If at least one receiving-confirmation signal is not received from other terminals in group 2 within predetermined times, the self-terminal sends the same data again (3) In the case that the self-terminal receives data whose sending-sequence number is smaller (older) than the receiving-sequence number being stored in the self-terminal, the self-terminal abandons the data.

(4) When the new terminal (1-1) sends data to other terminals in group 2, the terminal (1-1) begins to send data with the sending-sequence number being written in the connection participation message.

(5) Terminals (1-2~N) must wait for sending data whose sending-sequence number is larger (newer) than the sending-sequence number written in the connection participation reply message, until terminals (1-2~N) receive the connection participation confirmation message from terminal (1-1).

(6) Terminals (1-2~N) can send data whose sending-sequence number is smaller (older) than the sending-sequence number written in connection participation reply message in non-relation to connection participation confirmation message.

(7) When the terminal (1-1) receives data whose sending-sequence number is smaller (older) than the sending-sequence number being provided in the connection participation reply message, the terminal (1-1) abandons the data.

Figure 22:
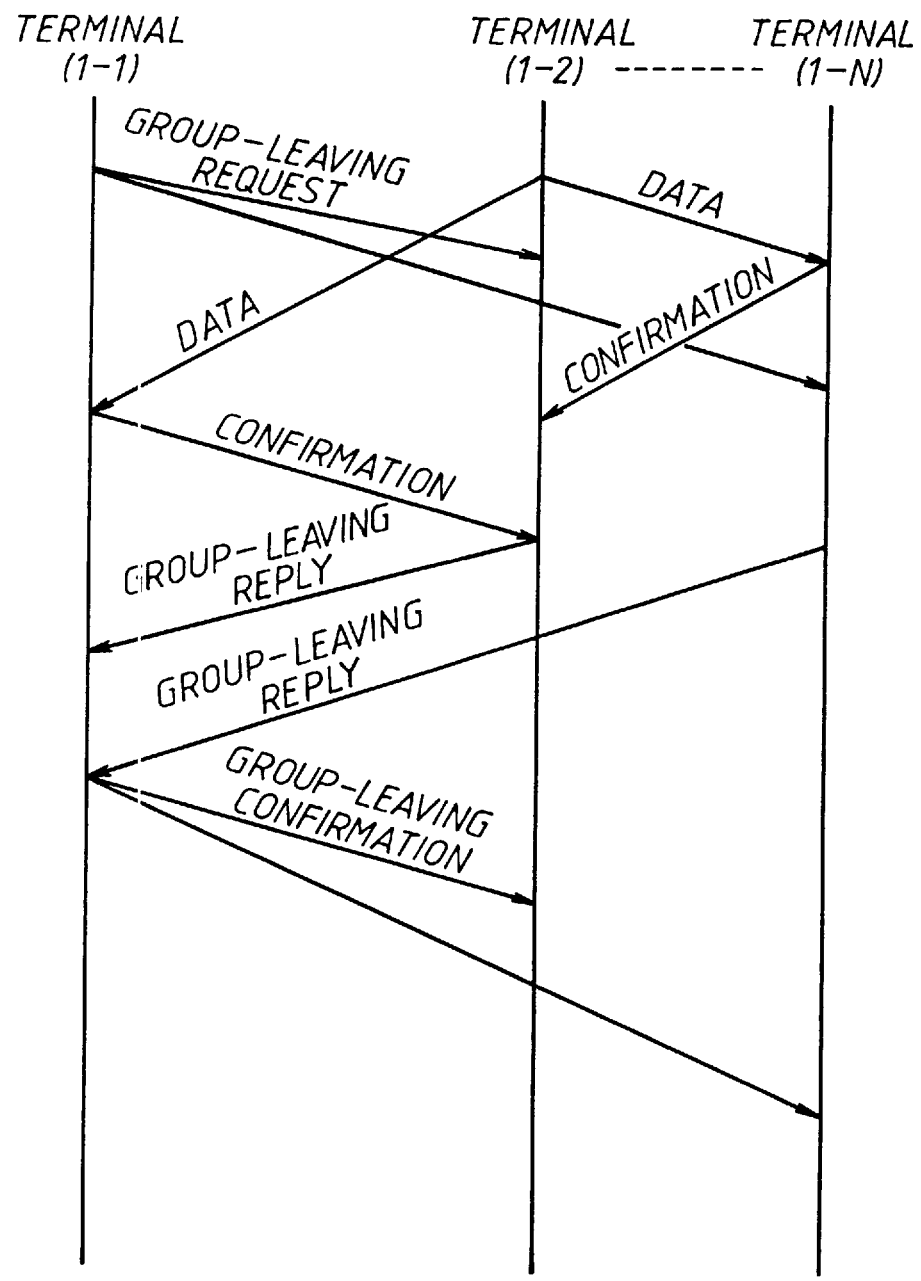
FIG. 22 is time chart for departure of one terminal from the group.

A method by which one terminal leaves from, i.e., departs from a group, will now be explained. In FIG. 18, it is assumed that terminal (1-1) departs from group 2. FIG. 22 shows a time chart for leaving terminal (1-1) departing from group 2 (terminals (1-2~N)).

(1) When the user-information process section 101 of terminal (1-1) outputs a departing or leaving-request, the group set section 13 of terminal (1-1) sends a group-leaving request message to other terminals (1-2~N) in group 2, after the terminal (1-1) receives the receiving-confirmation signal of data being sent by the terminal (1-1) from other terminals (1-2~N).

(2) When terminals (1-2~N) receive the group-leaving request message, each terminal sends the rest of the data from the user information process section 101 through all connections of group 2, and sends a group-leaving reply message to terminal (1-1) after each terminal receives the receiving-confirmation signal for the rest of the data.

(3) When terminal (1-1) receives the group-leaving reply message from all terminal s (1-2~N), the connection set section 19 deletes connection information of group 2 in the connection management table.

(4) After the terminal (1-1) sends the group-leaving confirmation message to terminal (1-2~N), the group set section 13 deletes group information for group 2 in the group management table.

(5) When terminals (1-2~N) receives the group-leaving confirmation message, the group set section 13 of each terminal deletes the terminal identifier of terminal (1-1) in the group management table. The processing for leaving group 2 is thus completed.

In these ways, management of terminals by units of group and management of connections by units of group are separated according to the third embodiment. Therefore, when a new terminal participates in the group, the new terminal can easily connect to all MMC (connections) of the group without connecting to each MMC separately.

A fourth embodiment of the present invention is described next.

Figure 23:
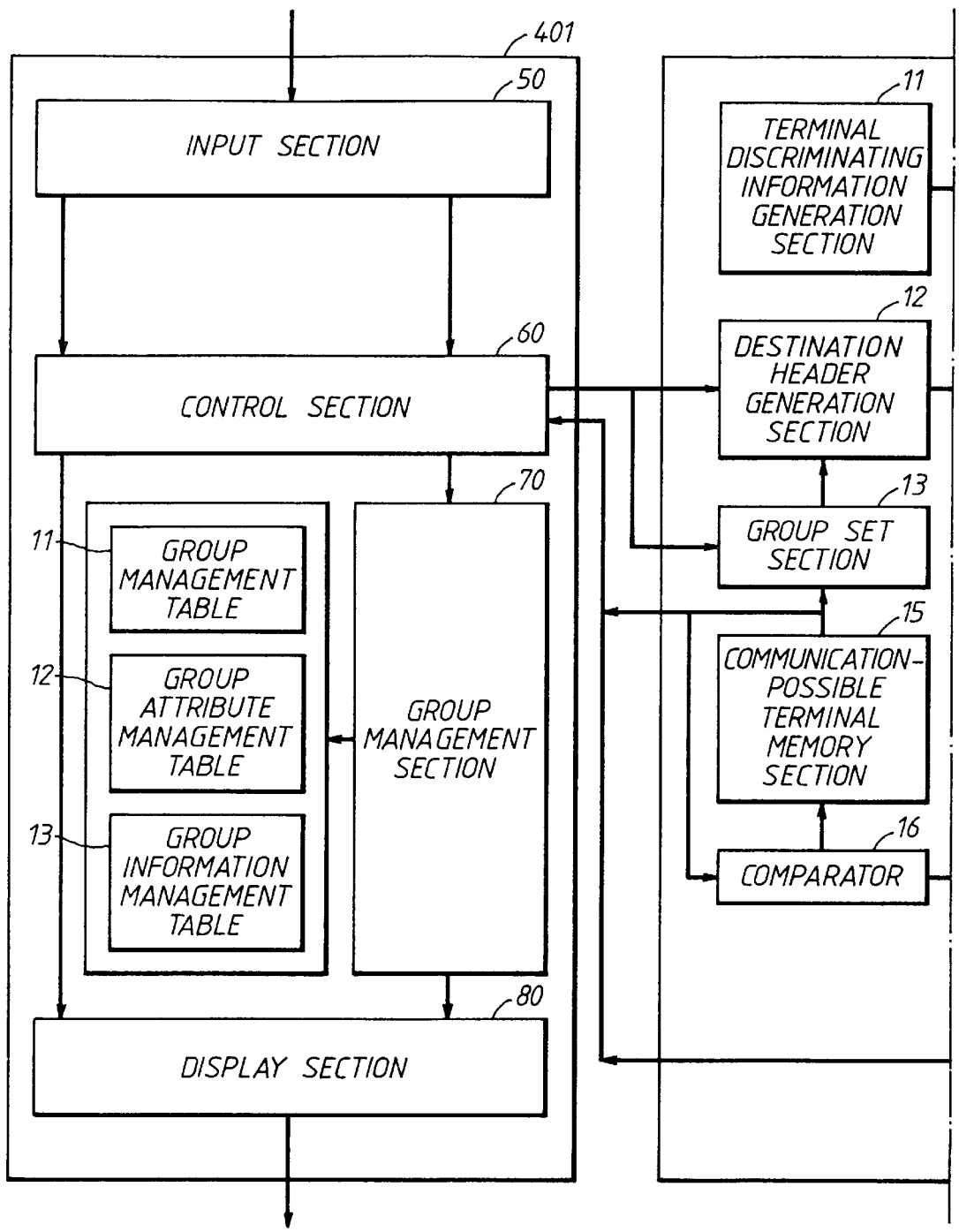
FIG. 23 is a block diagram of communication control apparatus according to a fourth embodiment.
Figure 23:
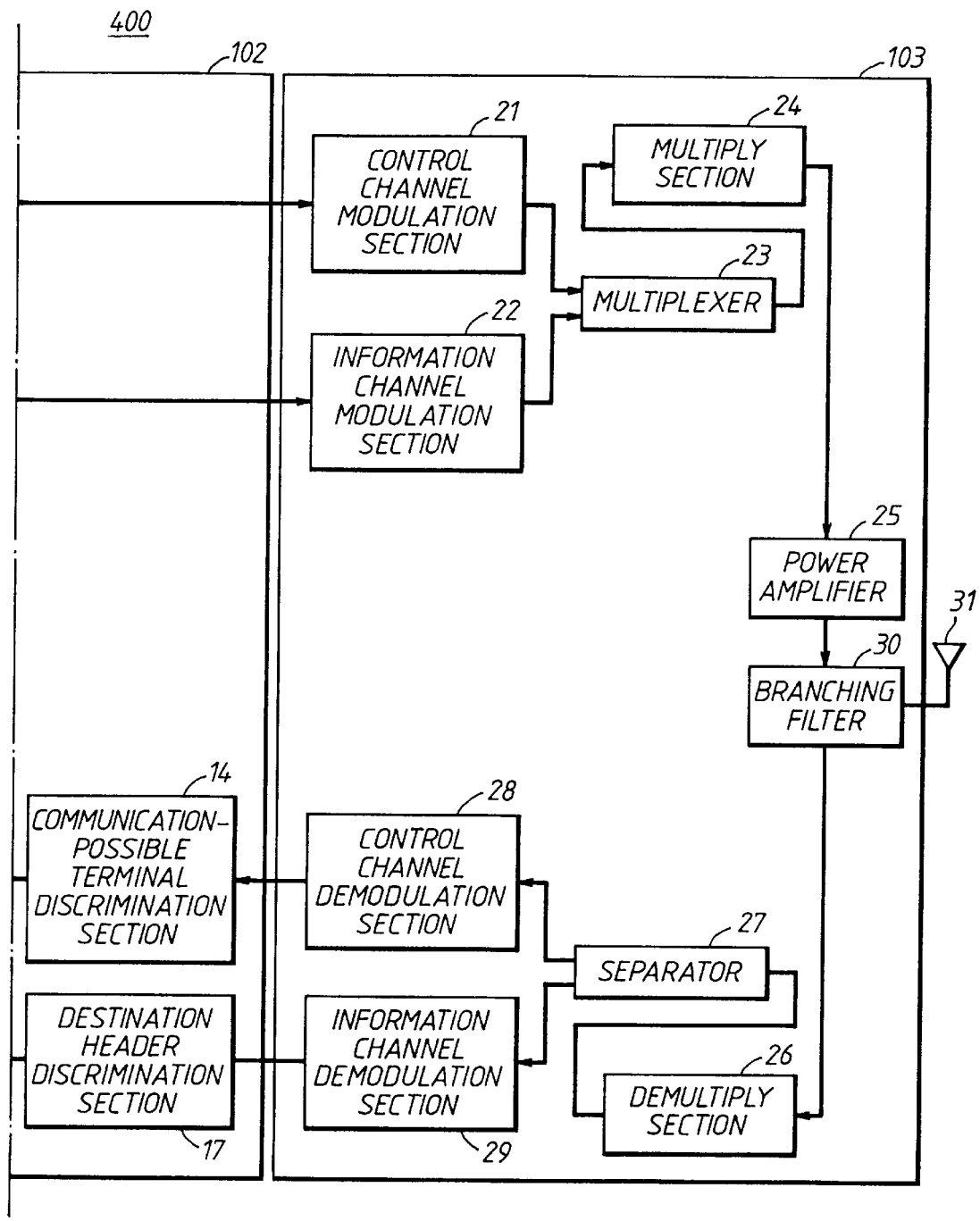

FIG. 23 is a block diagram of a communication control apparatus 400 corresponding to the communication control apparatus 100 in FIG. 1, with like elements identified by the same reference numerals. In FIG. 23, a user-information process section 401 executes an application-program. The communication control section 102 controls the sending and receiving of data. The wireless transmission section 103 transmits control information from the communication control section 102 and sending-information from the user-information process section 401 by wireless transmission. The communication control section 102 and the wireless transmission section 103 are the same as those of the first embodiment. The user-information process section 401 outputs group set order and group-designation information to the group set section 13. In the case that the group set section 13 creates a correspondence table for storing group and terminal discriminating information according to the group set order, a group-identifier is set for each group.

Processing performed by the user-information process section 401 will now be explained. In the user-information process section 401, the group management section 70 controls a group management table 71 (FIG. 27), a group attribute management table 72 (FIG. 28), and a group information management table 73(FIG. 29). When the control section 60 receives another terminal's request to participate in the group through the communication control section 102 and agrees with the request, the information of the group management table is updated. The case in which a user sets a security attribute and discriminating information for each group will be explained. In this case, if attribute and discriminating information are set by one terminal of the group in an initialization mode, other terminals of the group cannot change the attribute and discriminating information.

(1) The user inputs the security attribute of the communication group through the input section 50.

(2) The control section 60 registers the security attribute in the group attribute management table 72. The security attribute includes at least a display attribute for displaying group-information and a participation attribute for participating in the group.

(3) The control section 60 requests the communication control section 102 to send the attribute to other terminals in the group.

(4) The user inputs group-information (contents), user name, discriminating information of the group through the input section 50.

(5) The control section 60 registers the contents, user name and discriminating information in the group information management table 73.

(6) The control section 60 requests the communication control section 102 to send the contents, user name and discriminating information to other terminals in the group.

(7) If the communication control section 102 receives another terminal's request for participating in the group, the control section 60 decides whether the other terminal participates in the group or not according to the group attribute management table 12.

(a) If the participation attribute of the group is "possible", the control section 60 sends a permission-order to the communication control section 102. When the control section 60 receives completion signal, indicating that the other terminal participates in the group, from the communication control section 102, the control section 60 outputs information of the other terminal to the display section 80. This information includes the user name of the other terminal, group name in which the other terminal participates and so on.

(b) If the participation attribute of the group is "impossible", the control section 60 outputs information of the other terminal to the display section 80.

(8) When the control section 60 receives the user's request for displaying group-information through the input section 50, the control section 60 decides whether the group-information can be displayed or not according to the display attribute of the group attribute management table 72. In this case, group-information of groups whose display attributes are "possible" are only displayed.

Figure 24:
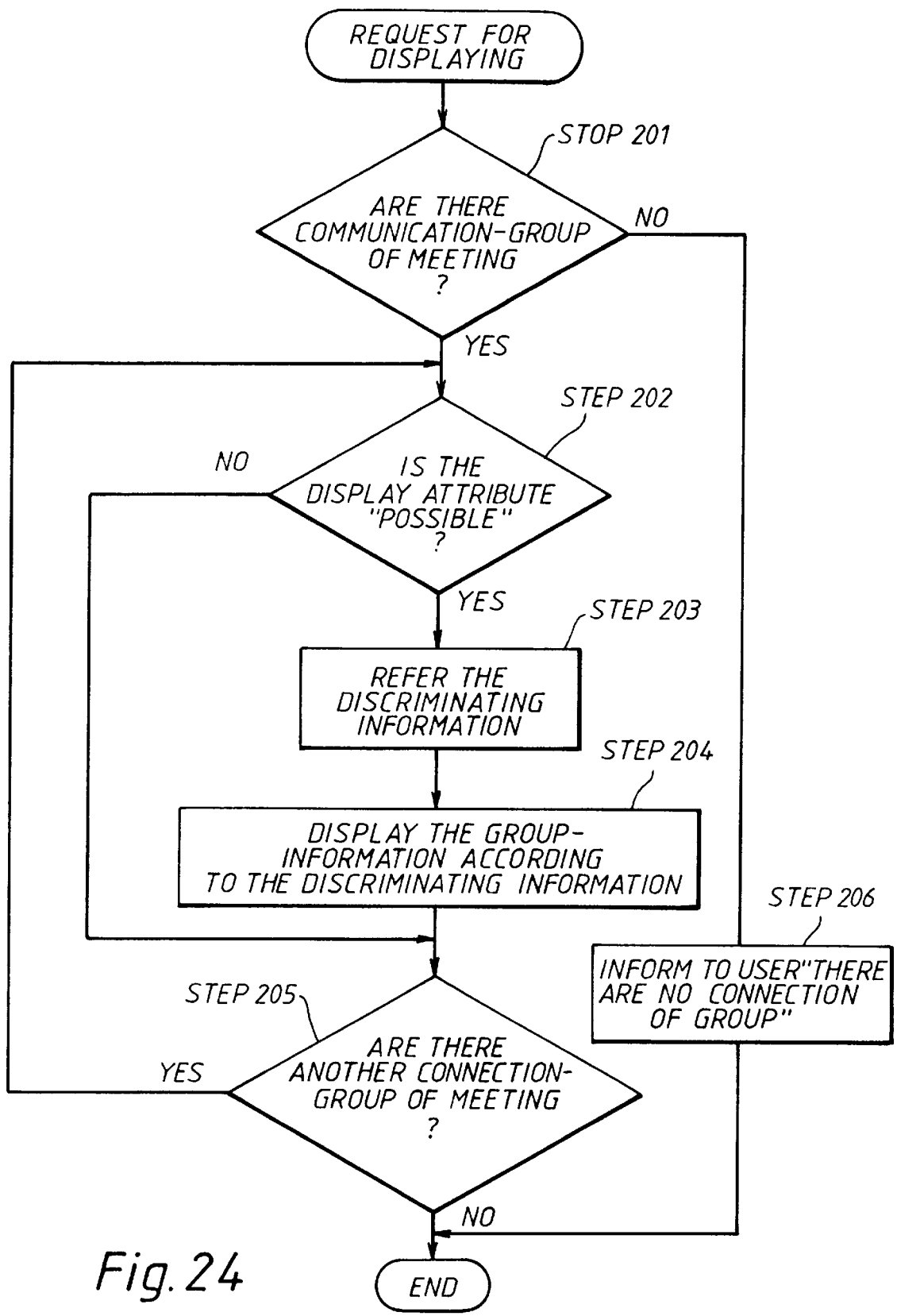
FIG. 24 is a flow chart of processing of the control section in case that a user requests displaying of group-information.

FIG. 24 is a flow chart of the processing of the control section 60 in the case that the user requests displaying of group-information. It is assumed that there are plural groups which execute meeting-application programs respectively on the network. In this case, the group-information includes meeting name, user name of the group, and discriminating information of the meeting.

First, the control section 60 decides whether there is a communication-group of the meeting or not according to the group management table 71 (step 201). If there is not a communication-group, the control section 60 informs this result (there is no communication-group) to the user (step 206). If there is a communication-group, the control section 60 decides whether the group-information is displayed or not according to t he group attribute management table 72 (step 202). If the display attribute of the group is "possible", the control section 60 refers to the group-information management table 73 to search contents, user name and discriminating information of the group (step 203). Then, the group-information is displayed as shown in FIG. 30 (step 204). In this case, display-information is changed according to the display attribute. For example, if the display attribute is "possible for all items", all information of the group information management table 73 is displayed. If the display attribute is "possible for discriminating information only", the discriminating information is only displayed. If the display attribute is "impossible", the information is not displayed. The above-described processing is executed for all communication-groups (step 205).

In FIG. 24, group-information of all communication-groups is displayed. However, group-information of specified communication-groups may be only displayed. In this case, the user inputs the group-identifier of the specified group.

Figure 25:
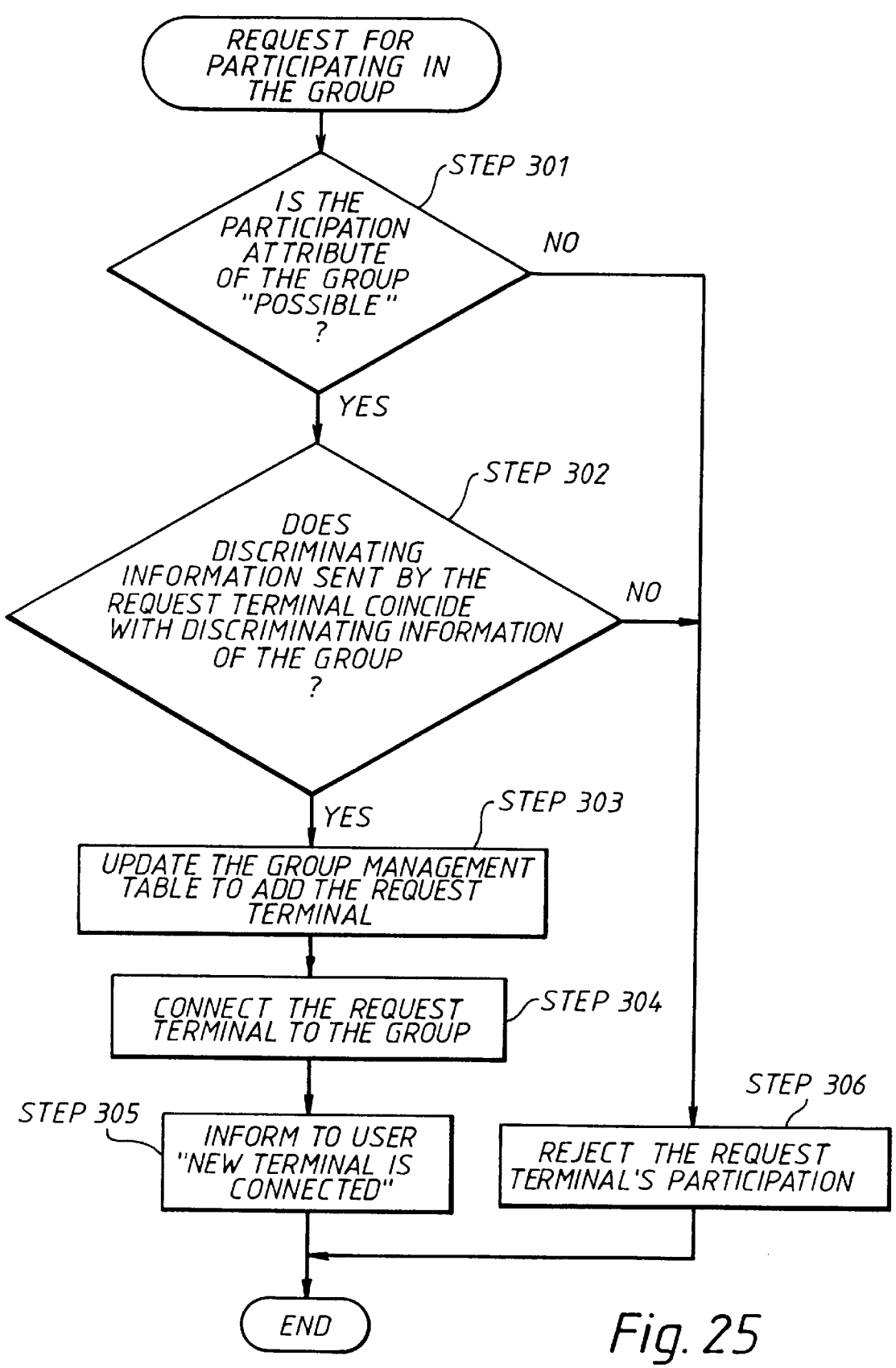
FIG. 25 is a flow chart of the control section for deciding whether a new terminal can participate in a group.

FIG. 25 shows a flow chart of the control section 60 for deciding whether a new terminal participates in the group or not when the control section 60 receives the new terminal's request for participating in the group through the communication process section. First, the control section 60 decides whether a participation attribute of the group is "possible" or not according to the group attribute management table 72 (step 301). If the participation attribute is "impossible", the control section 60 rejects the new terminal's participation in the group (step 306). If the participation attribute is "possible", the control section 60 decides whether discriminating information of the group sent by the new terminal coincides with the discriminating information of the group information management table 73 or not (step 302). If the discriminating information does not coincide, the control section 60 rejects the new terminal's participation in the group (step 306). If the discriminating information coincides, the control section 60 updates the group management table 71 to add the new terminal's identifier to the group (step 303), and indicates to the communication control section 102 to connect the new terminal in the group (step 304). Then, the control section 60 informs the user that the new terminal is connected to the group through the display section 80 as shown in FIG. 31 (step 305).

Figure 26:
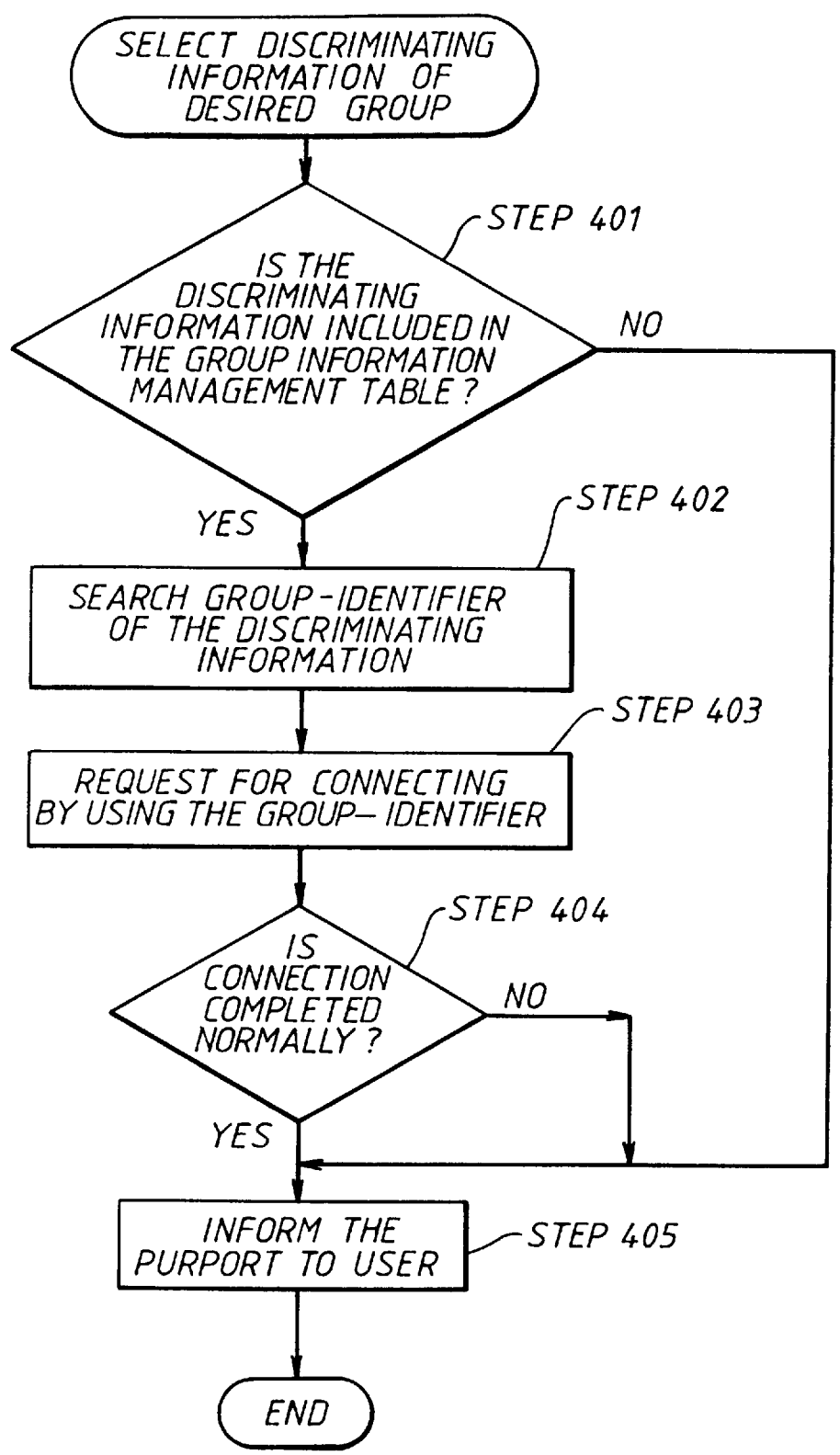
FIG. 26 is a flow chart of the control section for selecting communication-group to connect self-terminal.

FIG. 26 shows a flow chart of the control section 60 for selecting a communication-group to connect to the self-terminal. First, the user selects discriminating information of the communication-group, in which he wants to participate, through the input section 50. The control section 60 receives the discriminating information with the connection request from the input section 50. The control section 60 decides whether the discriminating information is included in the group information management table 73 or not (step 401). If the discriminating information is not included, the control section 60 informs the result (there is not such a communication—group) to user (step 405). If the discriminating information is included, the control section 60 searches for the group-identifier corresponding to the discriminating information from the group information management table 73 (step 402). Then, the control section 60 requests the communication control section 102 that the self-terminal connects to the group by using the group-identifier (step 403). When connection to the group is completed, the communication control 102 informs the result to the control section 60. The control section 60 decides whether the connection to the group is completed normally or not (step 404). If the connection is completed normally, the control section 60 informs the user through the display section 80 (step 405) that the self-terminal is connected to the group. If the connection is not completed normally, the control section 60 informs the user of failure to connect to the group (step 405).

A fifth embodiment of the present invention will now be described.

Figure 32:
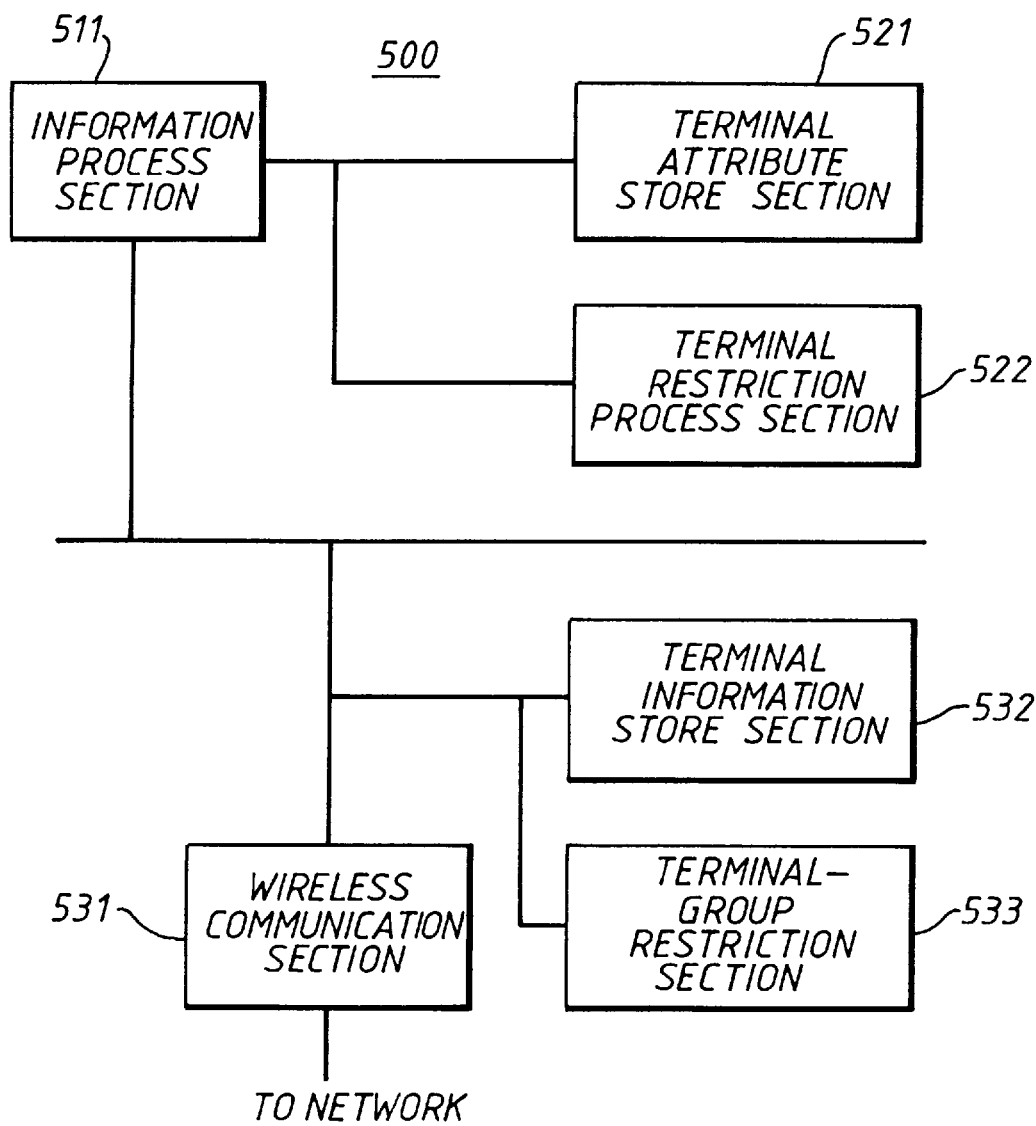
FIG. 32 is a block diagram of communication control section of a first example of a fifth embodiment.

FIG. 32 is block diagram of a communication control section 500 according to a first example of the fifth embodiment. The communication control section 500 includes an information process section 511, a terminal attribute store section 521, a terminal restriction process section 522, a wireless communication section 531, a terminal information store section 532 and a terminal-group restriction section 533. The information process section 511 executes user processes and system processes (OS). In general, the information process section 511 is comprised of a calculation section (CPU) and a memory section. When the information process section 511 cannot execute a program and peripheral equipment is necessary to execute the program, the information process section 511 requests the terminal restriction process section 522 to search for another terminal capable of executing the program. (the terminal that can execute the program is called a process-possible terminal). The terminal attribute store section 521 stores information of functions of each terminal restricted by the terminal-group restriction section 533, the self-terminal's situation (for example, loading), and a terminal attribute for communication. The terminal restriction process section 522 restricts the terminal identifier of the process-possible terminal according to the request of the information process section 511, and sends the terminal identifier to the information process section 511. The terminal information store section 532 stores the attribute which the self-terminal and other terminal exchange. The attribute is sent to the terminal restriction process section 522 of the other terminal through the wireless communication section 531. The terminal-group restriction section 533 restricts a group of terminals capable of communicating with the self-terminal according to the attribute stored in the terminal information store section 532. The terminal-group restriction section 533 then sets a group-identifier for the group of terminals, and terminal identifier if necessary. The wireless communication section 531 transmits information from the information process section 511, the terminal information store section 532, and the terminal-group restriction section 533 to the group of terminals restricted by the terminal-group restriction section 533.

The processing of the communication control section will now be explained in detail.

(1) The communication control section 500 of the self-terminal exchanges the attribute stored in the terminal information store section 532 with the communication control section 500 of other terminals (2) In each communication control section 500, the terminal-group restriction section 533 restricts, i.e., identifies, other terminals capable of communicating with the self-terminal according to collected attribute information in the terminal information store section 532. Then, the terminal-group restriction section 533 sets a communication network to the restricted terminals by using terminal-identifiers.

(3) When a request is received from the restricted terminal, or periodically, the attribute of the self-terminal (function which self-terminal can execute) in the terminal attribute store section 521 is sent to the restricted terminal through the wireless communication section 531.

(4) When each communication control section 500 receives the attribute from another terminal, the attribute is stored by unit of terminal in the terminal attribute store section 521.

(5) In the case that processing which the self-terminal cannot execute is generated, the information process section 511 transfers information of the processing to the terminal restriction process section 522.

(6) The terminal restriction process section 522 restricts the process-possible terminal according to the attribute in the terminal attribute store section 521, when the terminal restriction process section 522 receives the information of the processing (7) After the terminal restriction process section 522 restricts the process-possible terminal, the information process section 511 transfers information which is necessary for the process-possible terminal to execute the processing to the wireless communication section 531. The wireless communication section 531 sends the information to the process-possible terminal and receives a processing-result from the process-possible terminal.

(8) In the case that the attribute in the terminal information store section 532 changes according to accident or movement of the self-terminal, the terminal information store section 532 transfers attribute-change information to the terminal attribute store section 521.

(9) The terminal attribute store section 521 updates the attribute according to the attribute-change information.

Figure 33:
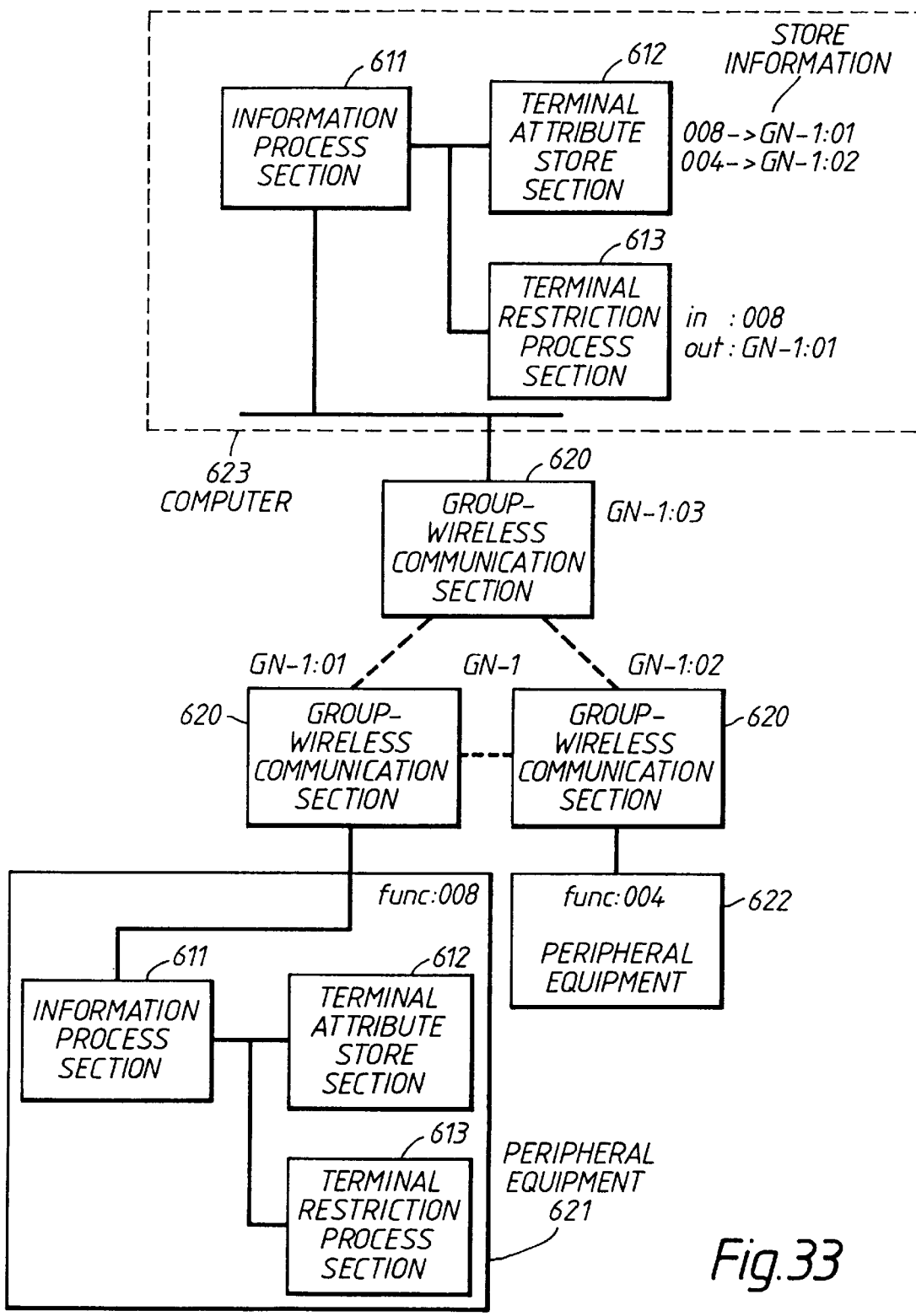
FIG. 33 is a block diagram of a communication system according to the first example of the fifth embodiment.

FIG. 33 shows a block diagram of a communicating system including a computer 623, and peripheral equipments 621,622. The communication control terminal (500 in FIG. 32) is provided in the computer 623, and the peripheral equipments 621,622. The communication control terminal is comprised of an information process section 611, a terminal attribute store section 612, a terminal restriction process section 613 and a group-wireless communication section 620. The group-wireless communication section 620 is comprised of the wireless communication section 531, the terminal information store section 532, and the terminal-group restriction section 533 as shown in FIG. 32. The group identifier of all group-wireless communication sections 620 is GN-1. The terminal identifier of the peripheral equipment 621 is 01, the terminal identifier of the peripheral equipment 622 is 02, and the terminal identifier of the computer equipment 623 is 03. The terminal attribute store section 612 stores the attribute of each peripheral equipment. In the computer 623, the terminal attribute store section 612 stores the attribute of the peripheral equipment 621, which group identifier is GN-1, terminal identifier is 01, and the process identifier is 008 (the process terminal represents that the terminal can execute that process). When impossible-process 008 (i.e., the information process section 611 cannot execute the process 008) is generated in the computer 623, process identifier 008 is transferred from the information process section 611 to the terminal restriction section 613. The terminal restriction section 613 restricts, i.e., determines, the other terminals) (peripheral equipment) capable of executing the process 008. In this case, it is decided that the peripheral equipment 621 (terminal identifier 01) can execute the process 008 according to the attribute in the terminal attribute store section 612. Therefore, a request for executing the process 008 is sent from the computer 623 to the peripheral equipment 621.

When the computer's environment is changed by accident or movement of equipment, the group-wireless communication section 620 transfers change-information to the terminal attribute store section 612 according to communication attribute in formation stored and exchanged among the group-wireless communication sections 620. Therefore, the terminal attribute store section 612 always stores the latest attribute of the computer's environment and a process-possible terminal suitable for the latest computer's environment is selected by the terminal restriction section 613.

In the case that the terminal restriction section 613 restricts plural process-possible terminals, the information process section 611 may output the attribute and name of each process-possible terminal through the display and the user may select one process-possible terminal among displayed process-possible terminals.

Figure 34:
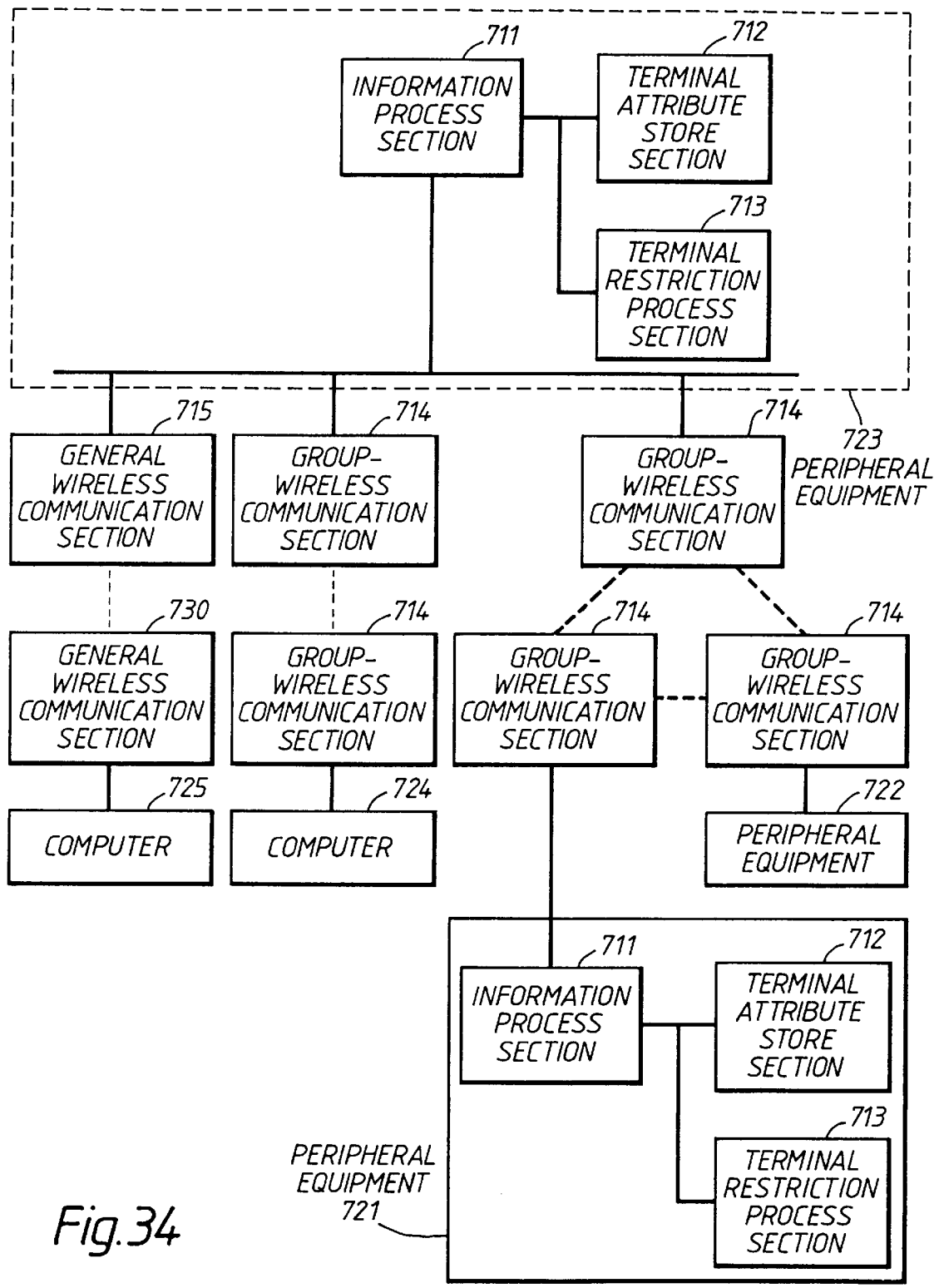
FIG. 34 is a block diagram of a group of communication control sections of a second example according to the fifth embodiment.

FIG. 34 is block diagram of a group consisting of communication control sections (computer and peripheral equipment) according to a second example of the fifth embodiment. A peripheral equipment 723 comprises an information process section 711, a terminal attribute store section 712, a terminal restriction process section 713, a group-wireless communication section 714 and a general wireless communication section 715. The general wireless communication section 715 can transmit information to the computer 725 having a general wireless communication section 730. A specific feature of the second example is that an impossible-process identifier is transferred from the computer 725 to the peripheral equipment server 723 through the general wireless communication section 730, 715 when an impossible-process is generated in the computer 725.

First, a request for executing the impossible-process is sent from the computer 725 to the information process section 711 of the peripheral environment server 723 through the general wireless communication sections 730, 715. The information process section 711 transfers the impossible-process information to the terminal restriction process section 713. The terminal restriction process section 713 restricts, i.e., determines, if there are other terminal(s) (other computer or other equipment) capable of executing the impossible-process. The information process section 711 then sends information necessary for executing the impossible-process to a restricted terminal through the group-wireless communication section 714. When the peripheral equipment server 723 receives an execution result from the restricted terminal, the execution result is sent to the computer 725.

Figure 35:
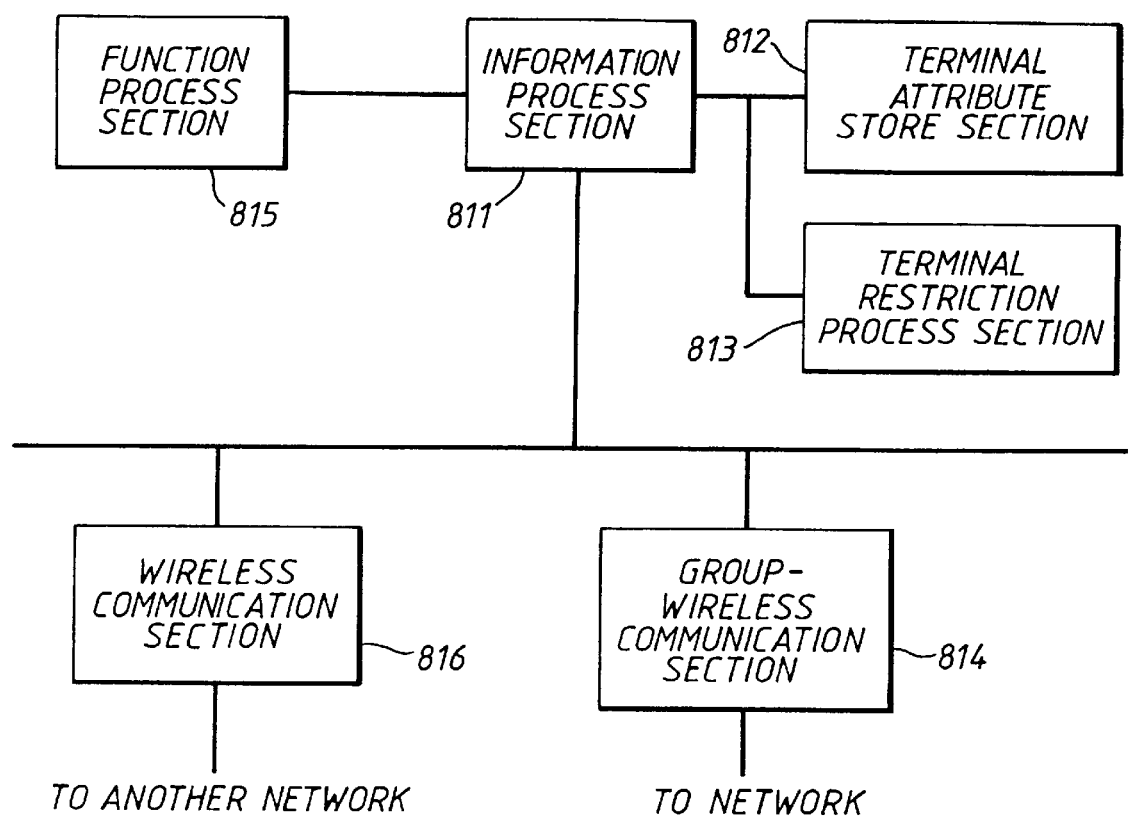
FIG. 35 is a block diagram of a communication control section of a third example according to the fifth embodiment.

FIG. 35 is block diagram of communication control section according to a third example of the fifth embodiment. The communication control section comprises an information process section 811, a terminal attribute store section 812, a terminal restriction process section 813, a group-wireless communication section 814, a function process section 815 and a wireless communication section 816. A specific feature of the third example is providing the function process section 815 and the wireless communication section 816. The function process section 815 can execute the process which the information process section 811 can not execute. The wireless communication section 816 accesses a communication network different from communication network of the group-wireless communication section 814.

(1) Another terminal (not shown in FIG. 35) sends a request for executing the process which the self-terminal can execute through the group-wireless communication section 814. The request is transferred to the information process section 811.

(2) The information process section 811 executes the process if the information process section 811 can execute the process by itself.

(3) However, if the function process section 815 is necessary to execute the process, the information process section 811 transfers information of the process to the function process section 815.

(4) After executing the process, the function process section 815 sends back the execution result to the information process section 811.

(5) If it is necessary to send back the execution result to the other terminal which sent the request, the information process section 811 transfers the execution result to the group-wireless communication section 814.

(6) If the other terminal uses a communication network different from that of the group-wireless communication section 814, the information process section 811 transfers the execution result to the wireless communication section 816.

(7) If the other terminal, which uses communication network of the group-wireless communication section 814, requests information which is received by the wireless communication section 816 of the self-terminal, the information is processed by the information process section 811 and the function process section 815 of the self-terminal and sent to the other terminal through the group-wireless communication section 814 of the self-terminal.

Figure 36:
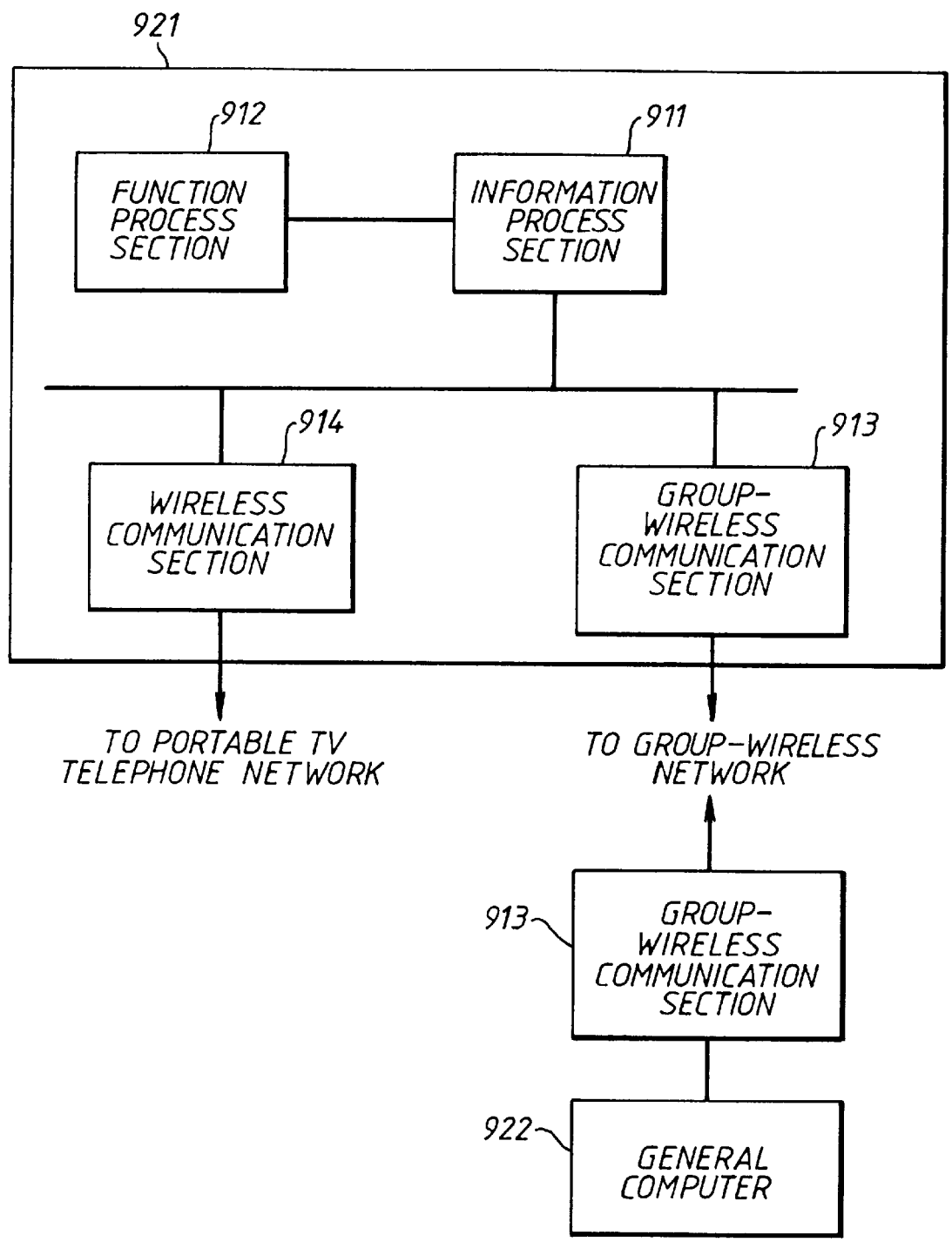
FIG. 36 is a block diagram of a particular example according to the third example of the fifth embodiment.

FIG. 36 is block diagram of the third example, which uses a general purpose computer and a portable TV telephone 921. The portable TV telephone 921 includes an information process section 911, a function process section 912, a group-wireless communication section 913 and a wireless communication section 914. The general computer 922 includes the group-wireless communication section 913.

(1) When the request to execute a process is sent from the general computer 922 to the group-wireless communication section 913 of portable TV telephone 921, the request is transferred to the information process section 911.

(2) The information process section 911 executes the process if the information process section 911 can execute the process by itself.

(3) If it is necessary for the portable TV telephone to execute the process, the information process section 911 transfers information of the request to the function process section 912, and receives the execution result from the function process section 912.

(4) If it is necessary to send back the execution result to the general computer 922, the information process section 911 sends the execution result to the general computer 922 through the group-wireless communication section 913.

(5) If the general computer 922 uses a network of the portable TV telephone that is different from the network of the group-wireless communication section 913, the execution result is transferred to the wireless communication section 914.

(6) On the other hand, if the general computer 922 requests information received by the wireless communication section 914, the information is processed by the information process section 911 and the function process section 912. Then, the processing-result is sent to the general computer 922 through the group-wireless communication section 913.

Figure 37:
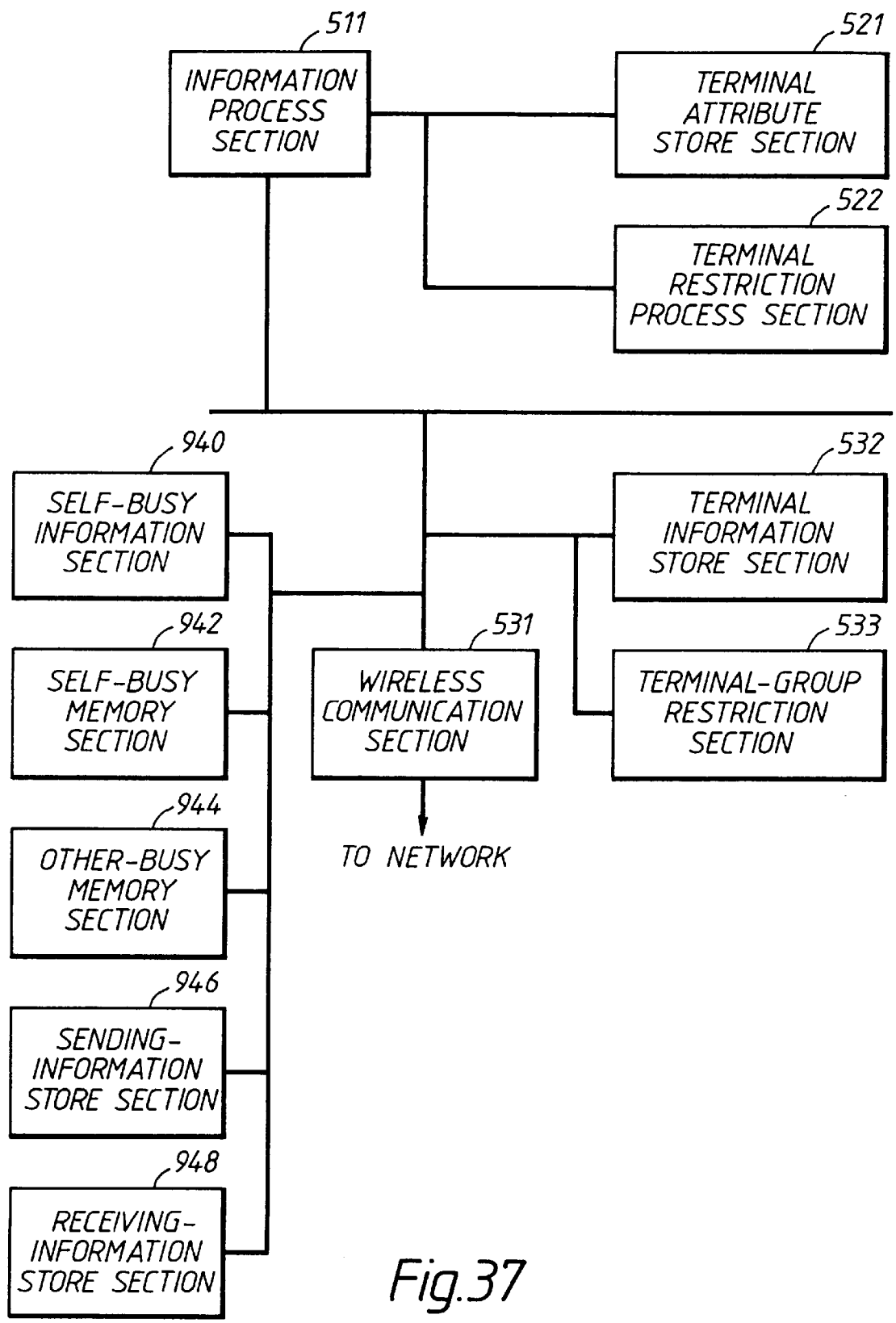
FIG. 37 is a block diagram of a communication control section of a fourth example according to the fifth embodiment.

FIG. 37 is block diagram of a communication control section according to a fourth example of the fifth embodiment. The fourth example includes a self-busy information section 940, a self-busy memory section 942, an other-busy memory section 944, a sending-information store section 946 and a receiving-information store section 948 in addition to the first example (FIG. 32). The self-busy information section 940 provides the self-busy information, indicating that the self-terminal is busy, to another terminal. The self-busy memory section 942 stores the self-busy information. The other-busy memory section 944 stores other-busy information which is sent by another terminal (another terminal that is busy). The sending-information store section 946 temporarily stores sending-information to send to the other terminal while other-busy information of the other terminal is stored in the other-busy memory section 944, until the other terminal is released from being busy. The receiving-information store section 948 temporarily stores receiving-information being received by the self-terminal while self-busy information is stored in the self-busy memory section 942, until the self-terminal is released from being busy. According to the fifth example, even if the self-terminal or the other terminal is busy, the self-terminal or the other terminal can execute a next process immediately when it is released from being busy.

Additional advantages And modifications will readily occur to those skilled in the art. The invention in its broader aspects is therefore not limited to the specific details, representative apparatus and method, and illustrative examples shown and described. Accordingly, departures may be made from such details without departing from the spirit or scope of the general inventive concept. Thus, it is intended that this invention cover the modifications and variations of the invention provided they are within the scope of the appended claims and their equivalents.

What is claimed is:

1. Communication control apparatus for use in a particular terminal which can communicate with other terminals, comprising;
   transmission means for transmitting terminal discriminating information to discriminate the particular terminal;
   receiving means for receiving terminal discriminating information transmitted by other terminals;
   discrimination means for discriminating at least one other terminal capable of communicating with the particular terminal in accordance with the terminal discriminating information received by said receiving means;
   group-setting means for setting the particular terminal and at least one other terminal discriminated by said discrimination means as member terminals of a group; and
   information sending means for sending information to at least one member terminal of the group.

2. Communication control apparatus according to claim 1, further comprising:
   memory means for storing terminal discriminating information representing terminal(s) with which communication is possible;
   comparison means for comparing the terminal discriminating information stored in said memory means with a recent discriminated result from said discrimination means; and
   update means for updating the terminal discriminating information stored in said memory means to be consistent with the recent discriminated result.

3. Communication control apparatus according to claim 1, wherein said information sending means sends multicast information to the members of the group.

4. Communication control apparatus according to claim 1, wherein said transmission means transmits additional information with the terminal discriminating information of the particular terminal, wherein said receiving means receives the additional information together with the terminal discriminating information of the at least one other terminal, and said receiving means includes means for displaying the additional information.

5. Communication control apparatus according to claim 1, wherein said transmission means and said information sending means transmit by wireless transmission or optical wireless transmission, and said receiving means receives by wireless transmission or optical wireless transmission.

6. Communication control apparatus according to claim 5, further comprising:
   transmission power variation means for varying the strength of transmission power; and
   means for controlling said transmission power variation means to decrease the strength of transmission power within limits at which each member terminal of the group is discriminated as a connectable terminal by said discrimination means.

7. Communication control apparatus according to claim 5, further comprising:
   transmission power variation means for varying the strength of transmission power; and
   means for controlling said transmission power variation means to increase the strength of transmission power when the number of terminals discriminated by said discrimination means becomes less than the number of terminals stored in said memory means and when at least one terminal of the group is not discriminated by said discrimination means.

8. A communication control method for use in a particular terminal which can communicate with other terminals, comprising the steps of;
   transmitting terminal discriminating information from the particular terminal to discriminate the particular terminal;
   receiving terminal discriminating information transmitted by other terminals;
   discriminating at least one other terminal capable of communicating with the particular terminal in accordance with the terminal discriminating information received in the receiving step;
   setting the particular terminal and at least one other terminal discriminated in the discriminating step as member terminals of a group; and
   sending information to at least one member terminal of the group.

9. Communication control apparatus for use in a particular terminal which can communicate with other terminals, comprising;
   terminal information storage means for storing terminal information identifying at least one other terminal capable of communicating with the particular terminal;
   terminal information transfer means for transferring the terminal information to said at least one other terminal;
   collected information storage means for storing the terminal information transferred to the particular terminal by said at least one other terminal as collected information; and
   terminal restriction means for restricting terminals capable of communicating with each other in accordance with both the terminal information and the collected information.

10. Communication control apparatus according to claim 9, further comprising;
   collected information transfer means for transferring the collected information to said at least one other terminal; and
   other terminal collected information storage means for storing collected information transferred by said at least one other terminal as other terminal collected information;
   wherein said terminal restriction means restricts terminals capable of communicating with each other in accordance with the terminal information, the collected information and the other terminal collected information.

11. Communication control apparatus according to claim 9, further comprising:
   identifier set means for setting an identifier of each terminal restricted by said terminal restriction means, for setting a group-identifier of a group of the terminals restricted by said terminal restriction means and for setting partial group-identifier to a part of the group.

12. Communication control apparatus according to claim 9, further comprising:
   communication channel set means for setting a communication channel of priority-use of each terminal restricted by said terminal restriction means.

13. Communication control apparatus according to claim 9, further comprising:
   group discrimination means for discriminating a group of the terminals restricted by said terminal restriction means as a unit of group;
   group-list storage means for storing a group-list including the group discriminated by said group discrimination means; and
   group update means for updating the group-list when the group of the terminals discriminated by said group discrimination means is different from the group in the group list.

14. Communication control apparatus according to claim 13, further comprising:
   attribute acquisition means for acquiring an attribute from each terminal in the group discriminated by said group discrimination means; and
   attribute storage means for storing the attribute acquired by said attribute acquisition means.

15. A communication control method for use in a particular terminal which can communicate with other terminals, comprising the steps of;
   storing terminal information identifying at least one other terminal capable of communicating with the particular terminal;
   transferring the terminal information to said at least one other terminal;
   storing the terminal information transferred to the particular terminal by said at least one other terminal as collected information; and
   restricting terminals capable of communicating with each other in accordance with both the terminal information and the collected information.

16. Communication control apparatus for use in a particular terminal which can communicate with other terminals, comprising;

group set means for setting one group to include plural terminals making a communication request from the particular terminal; and multipoint-to-multipoint set means for setting multipoint-to-multipoint connections among all terminals in the group set by said group set means.

17. Communication control apparatus according to claim 16, further comprising:

terminal subscription means for subscribing at least one additional terminal or plural terminals to the group set by said group set means;

wherein said multipoint-to-multipoint set means sets multipoint-to-multipoint connections to all terminals in the group including the terminal subscribed by said terminal subscription means.

18. Communication control apparatus according to claim 16, further comprising:

terminal removal means for removing a terminal from the group set by said group set means;

wherein said multipoint-to-multipoint set means sets multipoint-to-multipoint connections to all terminals in the group excluding the terminal removed by said terminal removal means.

19. Communication control apparatus according to claim 16, wherein said group set means sets plural groups, and said multipoint-to multipoint set means sets multipoint-to-multipoint connections for each group set by said group set means.

20. A communication control method for use in a particular terminal which can communicate with other terminals, comprising steps of:

setting one group to include plural terminals making a communication request from the particular terminal; and setting multipoint-to-multipoint connections among all terminals in the group set in the setting step.

21. Communication control apparatus for use in a particular terminal which can communicate with other terminals, comprising:

group set means for setting a group to include plural terminals in accordance with a request for communication from the particular terminal;

group-identifier memory means for storing a group-identifier of the group set by said group set means;

discriminating information input means for inputting discriminating information for the group-identifier stored in said group-identifier memory means;

discriminating information sending means for sending the discriminating information to another terminal of the group;

discriminating information storage means for storing other discriminating information sent by another terminal;

discriminating information request means for requesting the other discriminating information of the group-identifier; and display means for displaying the discriminating information of the group-identifier requested by said discriminating information request means.

22. Communication control apparatus according to claim 21, further comprising:

attribute input means for inputting an attribute of security for the group-identifier stored in said group-identifier memory means;

attribute memory means for storing the attribute of security input by said attribute input means; and decision means for deciding a condition of a group corresponding to the group-identifier stored in said attribute memory means based on the attribute.

23. Communication control apparatus according to claim 22, wherein the attribute of security is an attribute of displaying or non-displaying the discriminating information, and wherein said decision means causes said display means to display the discriminating information requested by said discriminating information request means when the attribute of security is the attribute of displaying, and causes said display means not to display the discriminating information requested by said discriminating information request means when the attribute of security is the attribute of non-displaying.

24. Communication control apparatus according to claim 22, wherein the attribute of security is an attribute of participating or non-participating in the group, and wherein said decision means causes said group set means to set an additional terminal making a connection request to the group when the attribute of security is the attribute of participating, and causes said group set means not to set the additional terminal making the connection request to the group when the attribute of security is the attribute of non-participating.

25. A communication control method for use in a particular terminal which can communicate with other terminals, comprising the steps of:

setting a group to include plural terminals in accordance with a request for communication from the particular terminal;

storing a group-identifier of the group set in the setting step, inputting discriminating information of the group-identifier stored in the storing step;

sending the discriminating information to another terminal of the group;

storing other discriminating information sent by another terminal;

requesting the other discriminating information of the group-identifier; and displaying the other discriminating information of the group-identifier requested in the requesting step.

26. Communication control apparatus for a particular terminal which can communicate with other terminals, comprising:

equipment information storage means for storing equipment information identifying first equipment capable of communicating with the particular terminal;

equipment information transfer means for transferring the equipment information to other equipments;

collected information storage means for storing other equipment information transferred by the other equipments as collected information;

equipment restriction means for restricting the other equipment capable of communicating with each other in accordance with both the equipment information and the collected information;

exchange means for exchanging function-information of the first equipment with other function-information of the other equipment restricted by said equipment restriction means;

processing equipment restriction means for restricting at least one other equipment having a function which the first equipment does not have, in accordance with the other function-information exchanged by said exchange means; and information transfer means for transferring information to the at least one other equipment restricted by said processing equipment restriction means, wherein the information is required to be processed by the at least one other equipment.

27. Communication control apparatus according to claim 26, further comprising:

selection means for displaying a name and attribute of plural equipments, and for selecting one of the plural equipments when said processing equipment restriction means restricts plural equipments.

28. Communication control apparatus according to claim 26, further comprising:

self-busy notification means for identifying self-busy information which represents that the first equipment is processing to the other equipment;

self-busy memory means for storing the self-busy information;

other-busy memory means for storing other-busy information which represents that the other equipment is processing, wherein the other-busy information is transferred to the first equipment by the other equipment;

sending information storage means for temporarily storing information until the other equipment is free from processing, when the information is sent to the other equipment while the other-busy information is stored in said other-busy memory means; and receiving information storage means for temporarily storing other information until the first equipment is free from processing, when the other information is received from the other equipment while the self-busy information is stored in said self-busy memory means.

29. Communication control method for use in a particular terminal which can communicate with other terminals, comprising the steps of:

storing equipment information identifying first equipment capable of communicating with the particular terminal;

transferring the equipment information to other equipments;

storing other equipment information transferred by the other equipments as collected information;

restricting the other equipment capable of communicating with each other in accordance with both the equipment information and the collected information;

exchanging function-information of the first equipment with other function-information of the other equipment restricted in the restricting step;

restricting at least one other equipment having a function which the first equipment does not have, in accordance with the other function-information exchanged in the exchanging step; and transferring information to the at least one other equipment restricted in the restricting step, wherein the information is required to be processed by at least one other equipment.

30. A computer readable memory containing computer-readable instructions to control communication in a particular terminal, comprising:

instruction means for causing a computer to transmit a terminal discriminating information to discriminate the particular terminal;

instruction means for causing the computer to receive other terminal discriminating information transmitted by other terminals;

instruction means for causing the computer to discriminate at least one other terminal capable of communicating with the particular terminal in accordance with the other terminal discriminating information;

instruction means for causing the computer to set the particular terminal and at least one other terminal as member terminals of a group; and instruction means for causing the computer to send information to at least one member terminal of the group.

31. A computer readable memory containing computer-readable instructions to control communication in a particular terminal, comprising:

instruction means for causing a computer to store terminal information identifying at least one other terminal capable of communicating with the particular terminal;

instruction means for causing the computer to transfer the terminal information to the at least one other terminal;

instruction means for causing the computer to store other terminal information transferred to the particular terminal by the at least one other terminal as collected information; and instruction means for causing the computer to restrict terminals capable of communicating with each other in accordance with both the terminal information and the collected information.

32. A computer readable memory containing computer-readable instructions to control communication in a particular terminal, comprising:

instruction means for causing a computer to set one group to include plural terminals making a communication request from the particular terminal; and instruction means for causing the computer to set multipoint-to-multipoint connections among all terminals in the group.

33. A computer readable memory containing computer-readable instructions to control communication in a particular terminal; comprising:

instruction means for causing a computer to set a group to include plural terminals in accordance with a request for communication from the particular terminal;

instruction means for causing a computer to store a group-identifier of the group;

instruction means for causing the computer to input a discriminating information of the group-identifier;

instruction means for causing the computer to send the discriminating information to other terminal(s) of the group;

instruction means for causing the computer to store other discriminating information sent by the other terminal(s);

instruction means for causing the computer to request the other discriminating information of the group-identifier; and instruction means for causing the computer to display the other discriminating information of the group-identifier requested.

34. A computer readable memory containing computer-readable instructions to control communication in a particular terminal; comprising:

instruction means for causing a computer to store an equipment information identifying a first equipment capable of communicating with the particular terminal;

instruction means for causing the computer to transfer the equipment information to other equipments;

instruction means for causing the computer to store other equipment information transferred by the other equipments as collected information;

instruction means for causing the computer to restrict the other equipment capable of communicating with each other in accordance with both the equipment information and the collected information;

instruction means for causing the computer to exchange a function-information of the first equipment with other-function information of the other equipment restricted;

instruction means for causing the computer to restrict at least one other equipment having a function which the first equipment does not have, in accordance with the other function-information exchanged; and instruction means for causing the computer to transfer information to the at least one other equipment restricted, wherein the information is required to be processed by the at least one other equipment.

35. A communication terminal comprising:

transmission means for transmitting a specific terminal discriminating information to identify the terminal;

receiving means for receiving other terminal discriminating information transmitted by another terminal or terminals;

discrimination means for discriminating at least one other terminal capable of communicating with the terminal in accordance with the other terminal discriminating information received by said receiving means, group-set means for setting the terminal and at least one other terminal discriminated by said discrimination means as member terminals of a group; and information sending means for sending information to at least one member terminal of the group.

* * * * *